(12) United States Patent
Cornelius et al.

(10) Patent No.: US 8,769,081 B2
(45) Date of Patent: *Jul. 1, 2014

(54) REMOTELY MONITORING A DATA PROCESSING SYSTEM VIA A COMMUNICATIONS NETWORK

(75) Inventors: Shawn S. Cornelius, Strongsville, OH (US); Clifford Donoughe, Medina, OH (US); Arnold Z. Huffman, Chicago, IL (US); Richard R. Krahn, North Lake Elmo, MN (US); Michael S. Sweeney, Parma Heights, OH (US)

(73) Assignee: Accenture Global Services Limited, Dublin (IE)

( * ) Notice: Subject to any disclaimer, the term of this patent is extended or adjusted under 35 U.S.C. 154(b) by 977 days.

This patent is subject to a terminal disclaimer.

(21) Appl. No.: 12/008,846

(22) Filed: Jan. 15, 2008

(65) Prior Publication Data

US 2008/0183728 A1 Jul. 31, 2008

Related U.S. Application Data

(63) Continuation of application No. 09/943,964, filed on Aug. 31, 2001, now Pat. No. 7,389,341.

(60) Provisional application No. 60/265,538, filed on Jan. 31, 2001.

(51) Int. Cl.
*G06F 15/173* (2006.01)

(52) U.S. Cl.
USPC ............ 709/224; 709/223; 370/216; 370/241

(58) Field of Classification Search
USPC .......................... 370/216, 241; 709/223, 224
See application file for complete search history.

(56) References Cited

U.S. PATENT DOCUMENTS 4,380,063 A * 4/1983 Janson et al. ................. 370/235
4,531,182 A 7/1985 Hyatt (Continued)

FOREIGN PATENT DOCUMENTS

EP 0 666 667 A2 8/1995
EP 0 957 616 A2 11/1999

(Continued)

OTHER PUBLICATIONS

Yang, Sheausong et al., "Message Flow Analysis and Run-Time Verification for Parallel Programs," Proceedings of the 1989 International Conference on Parallel Processing held on Aug. 8-12, 1989, vol. II Software, Aug. 8, 1989, pp. II 19-22.

(Continued)

*Primary Examiner* — Backhean Tiv
(74) *Attorney, Agent, or Firm* — Brinks Gilson & Lione

(57) ABSTRACT

A remote data processing system facilitates monitoring of the remote data processing system. The remote data processing system receives a data message via a communications network. The remote data processing system cascades at least a first stage software component and a second stage software component to form an installed remote software module for accepting the received data message. The remote data processing system detects the data message or a derivative at a group of logical nodes within the installed remote software module to determine flow of the data message, or a derivative thereof, between the logical nodes. The remote data processing system identifies a deficient software component of the installed remote software module as any of said software stage components that blocks or disrupts the flow of the data message between two adjacent logical nodes.

43 Claims, 15 Drawing Sheets

(56) References Cited

U.S. PATENT DOCUMENTS

| | | | |
|---|---|---|---|
| 4,607,365 A * | 8/1986 | Greig et al. ............... 714/4 |
| 4,686,698 A * | 8/1987 | Tompkins et al. ......... 348/230.1 |
| 5,175,820 A | 12/1992 | Gephardt |
| 5,237,677 A * | 8/1993 | Hirosawa et al. ............ 714/57 |
| 5,410,651 A * | 4/1995 | Sekizawa et al. ............ 709/224 |
| 5,428,806 A * | 6/1995 | Pocrass ........................ 710/104 |
| 5,440,726 A * | 8/1995 | Fuchs et al. .................. 714/20 |
| 5,504,921 A | 4/1996 | Dev et al. |
| 5,517,655 A | 5/1996 | Collins et al. |
| 5,621,892 A * | 4/1997 | Cook ........................... 709/224 |
| 5,627,766 A | 5/1997 | Beaven |
| 5,644,706 A * | 7/1997 | Ruigrok et al. ............... 714/48 |
| 5,732,212 A | 3/1998 | Perholtz et al. |
| 5,740,354 A | 4/1998 | Ben-Natan et al. |
| 5,758,126 A | 5/1998 | Daniels et al. |
| 5,768,300 A | 6/1998 | Sastry et al. |
| 5,796,951 A | 8/1998 | Hamner et al. |
| 5,832,511 A | 11/1998 | Beck et al. |
| 5,835,911 A | 11/1998 | Nakagawa et al. |
| 5,864,658 A * | 1/1999 | Theobald ....................... 714/25 |
| 5,938,732 A | 8/1999 | Lim et al. |
| 5,960,439 A | 9/1999 | Hamner et al. |
| 5,961,596 A | 10/1999 | Takubo et al. |
| 5,964,839 A | 10/1999 | Johnson et al. |
| 5,974,046 A | 10/1999 | Kim et al. |
| 6,012,059 A | 1/2000 | Neimat et al. |
| 6,012,152 A * | 1/2000 | Douik et al. .................... 714/26 |
| 6,034,948 A * | 3/2000 | Nakamura et al. ............ 370/246 |
| 6,038,219 A | 3/2000 | Mawhinney et al. |
| 6,055,493 A | 4/2000 | Ries et al. |
| 6,076,106 A | 6/2000 | Hamner et al. |
| 6,119,157 A | 9/2000 | Traversat et al. |
| 6,122,753 A * | 9/2000 | Masuo et al. ................... 714/4.2 |
| 6,125,390 A * | 9/2000 | Touboul ......................... 709/223 |
| 6,137,805 A | 10/2000 | Berstis |
| 6,145,001 A | 11/2000 | Scholl et al. |
| 6,178,441 B1 | 1/2001 | Elnozahy |
| 6,178,529 B1 | 1/2001 | Short et al. |
| 6,208,616 B1 * | 3/2001 | Mahalingam et al. ........ 370/216 |
| 6,230,201 B1 | 5/2001 | Guck et al. |
| 6,236,977 B1 | 5/2001 | Verba et al. |
| 6,279,826 B1 | 8/2001 | Gill et al. |
| 6,286,046 B1 | 9/2001 | Bryant |
| 6,289,380 B1 | 9/2001 | Battat et al. |
| 6,351,824 B1 | 2/2002 | Singh |
| 6,360,334 B1 | 3/2002 | Kavanagh et al. |
| 6,411,598 B1 * | 6/2002 | McGlade ....................... 370/217 |
| 6,445,774 B1 | 9/2002 | Kidder et al. |
| 6,496,476 B1 * | 12/2002 | Badt et al. ....................... 370/228 |
| 6,553,507 B1 | 4/2003 | Cohen |
| 6,678,369 B2 * | 1/2004 | DeMent et al. ........... 379/221.03 |
| 6,718,370 B1 * | 4/2004 | Coffman et al. ............... 709/212 |
| 6,718,482 B2 * | 4/2004 | Sato et al. .......................... 714/4 |
| 6,728,781 B1 * | 4/2004 | Aguilera et al. .............. 709/240 |
| 6,775,236 B1 | 8/2004 | Scrandis et al. |
| 6,813,634 B1 * | 11/2004 | Ahmed ........................... 709/224 |
| 6,834,304 B1 | 12/2004 | Nisbet et al. |
| 6,882,653 B1 | 4/2005 | Kiuchi et al. |
| 6,894,969 B1 * | 5/2005 | Chidambaran et al. ........ 370/216 |
| 6,944,129 B1 * | 9/2005 | Duncan ......................... 370/236 |
| 7,133,929 B1 | 11/2006 | Shah .............................. 709/241 |
| 7,389,341 B2 * | 6/2008 | Cornelius et al. ............. 709/224 |
| 7,539,134 B1 * | 5/2009 | Bowes .......................... 370/230 |
| 8,176,137 B2 * | 5/2012 | Cornelius et al. ............. 709/207 |
| 2002/0049815 A1 | 4/2002 | Dattatri |
| 2002/0068631 A1 | 6/2002 | Raverdy et al. |
| 2002/0091810 A1 * | 7/2002 | Hundscheidt et al. ........ 709/223 |
| 2002/0103900 A1 * | 8/2002 | Cornelius et al. ............. 709/224 |
| 2002/0112039 A1 | 8/2002 | Ullman |
| 2002/0116213 A1 | 8/2002 | Kavounis et al. |
| 2002/0172148 A1 * | 11/2002 | Kim et al. ...................... 370/216 |
| 2005/0055322 A1 | 3/2005 | Masters et al. |
| 2008/0183728 A1 * | 7/2008 | Cornelius et al. ............. 707/100 |

FOREIGN PATENT DOCUMENTS

| | | |
|---|---|---|
| WO | WO 97 23831 | 7/1997 |
| WO | WO 97/23831 A1 | 7/1997 |
| WO | WO 00 78004 A2 | 12/2000 |
| WO | WO 00/78004 A2 | 12/2000 |

OTHER PUBLICATIONS

Aerts, A.T.M et al., "Message Flow Control," Information Systems Development for Decentralized Organizations—Proceedings of the IFIP Working Conference on Information Systems Development for Decentralized Organizations, 1995, Published by Chapman & Hall, Aug. 21, 1995, pp. 51-66.
U.S. Appl. No. 09/943,964, filed Aug. 31, 2001, Cornelus et al.
U.S. Appl. No. 09/945,188, filed Aug. 31, 2001, Cornelus et al.
Wijata et al., "A Scalable Agent-Based Network Measurement Infrastructure," IEEE Communications Magazine, IEEE Service Center, Piscataway, US, vol. 38, No. 9, Sep. 1, 2000, pp. 174-183.
European Search Report for EPO Application No. EP 10 00 9529, mailed May 19, 2011, 8 pgs.

* cited by examiner

| TRADING PARTNER IDENTIFIER ⌐104 | TRANSACTION IDENTIFIER ⌐105 | INCOMING TIME ⌐106 | OUTGOING TIME ⌐107 | STATUS DATA ⌐108 |
|---|---|---|---|---|
| FIRST TRADING PARTNER | 1,000.00 | 1/31/2001, 10:30:00 AM | 1/31/2001, 10:34:00 AM | COMPLETE |
| SECOND TRADING PARTNER | 1,001.00 | 1/31/2001, 11:20:00 AM | 1/31/2001, 11:22:00 AM | COMPLETE |
| THIRD TRADING PARTNER | 1,002.00 | 1/31/2001, 1:12:00 PM | •• | NOT RECEIVED |
| NTH TRADING PARTNER | 1,003.00 | 1/31/2001, 10:30:00 PM | 1/31/2001, 10:45:00 PM | DATA CORRUPT |

FIG. 5

REMOTELY MONITORING A DATA PROCESSING SYSTEM VIA A COMMUNICATIONS NETWORK

This application is a continuation application of U.S. patent application Ser. No. 09/943,964, filed on Aug. 31, 2001 now U.S. Pat. No. 7,389,341, the entire contents of which are incorporated herein by reference, and which claims the benefit of the filing date of provisional application Ser. No. 60/265,538, entitled MANAGEMENT SYSTEM FOR REMOTELY MANAGING A DATA PROCESSING SYSTEM VIA A COMMUNICATIONS NETWORK and filed on Jan. 31, 2001, under 35 U.S.C. 119(e).

FIELD OF THE INVENTION

This invention relates to a management system and method for remotely monitoring a data processing system via a communications network.

BACKGROUND

Business entities may exchange information over a communications network such as the Internet. For example, one business entity may engage in transactions with a group of trading partners. The business entities may exchange information about transactions in goods, transactions involving a service, financial transactions or other information to enhance business operations. Electronic communications may promote transactional efficiency, such as a reduction of clerical errors from reduced human intervention or an increase in the speed of executing transactions.

In the context of a business-to-business communications environment, each trading partner that is a participant in the transaction or communication may maintain a data processing system (e.g., a server) to support the communication. However, the trading partners may make conflicting technical decisions on the maintenance of hardware and software for various data processing systems involved in the business-to-business communications environment. Trading partners may not share adequate technical information with each other or may simply fail to coordinate the installation of software upgrades, even where adequate technical information about other trading partners is available. For example, different trading partners may decide to upgrade their hardware or software platforms at different times which may result in the incompatibility of one or more software features or the inability to conduct a transaction. To avoid disruption of transactions or problems in the interoperability of technology and software functionality, the trading participants may agree to have upgrades and revisions handled by a single provider. Thus, a need exists for facilitating the single provider's management of the technical parameters of data processing systems of trading participants that may interact. Further, the need exists for efficiently providing software features and software upgrades for the trading participants in a business-to-business environment.

The trading partners of a business-to-business transaction generally desire sufficient technical support to reduce downtime or disruptions in the execution of transactions. Retaining skilled technicians and information technology professionals may be costly to provide reliable operations of the business-to-business environment. Further, such technicians may have inadequate access or capability to monitor and control data processing systems of other trading partners, which may impede the ability to correctly diagnose and address technical problems. Thus, a need exists to enhance the effectiveness of technicians by supporting remote monitoring and control of data processing systems of a trading group via one or more sites.

SUMMARY

In accordance with one aspect of the invention, a remote data processing system facilitates monitoring of the remote data processing system. The remote data processing system receives a data message via a communications network. The remote data processing system cascades at least a first stage software component and a second stage software component to form an installed remote software module for accepting the received data message. The remote data processing system detects the data message or a derivative at a group of logical nodes within the installed remote software module to determine flow of the data message, or a derivative thereof, between the logical nodes. The remote data processing system identifies a deficient software component of the installed remote software module as any of said software stage components that blocks or disrupts the flow of the data message between two adjacent logical nodes.

In accordance with another aspect of the invention, a data receiver of the remote data processing system receives a data message. A remote software module is arranged to receive the data message from the data receiver. The remote software module includes at least a first stage software component cascaded with a second stage software component. A fault detector is associated with the first software stage component and the second software stage component to detect whether the data message or a derivative thereof flows through at least one of the first stage software component and the second stage software component. The detection of the flow of the data message or the flow may be used to identify a faulty or defective software component in a remote data processing system such that corrective action may be taken to avoid disruption of one or more business-to-business transactions.

BRIEF DESCRIPTION OF THE DRAWINGS

FIG. 5 is a chart of transactional data and associated performance data that may be accessible via a management system of the invention.

DETAILED DESCRIPTION

Figure 1:
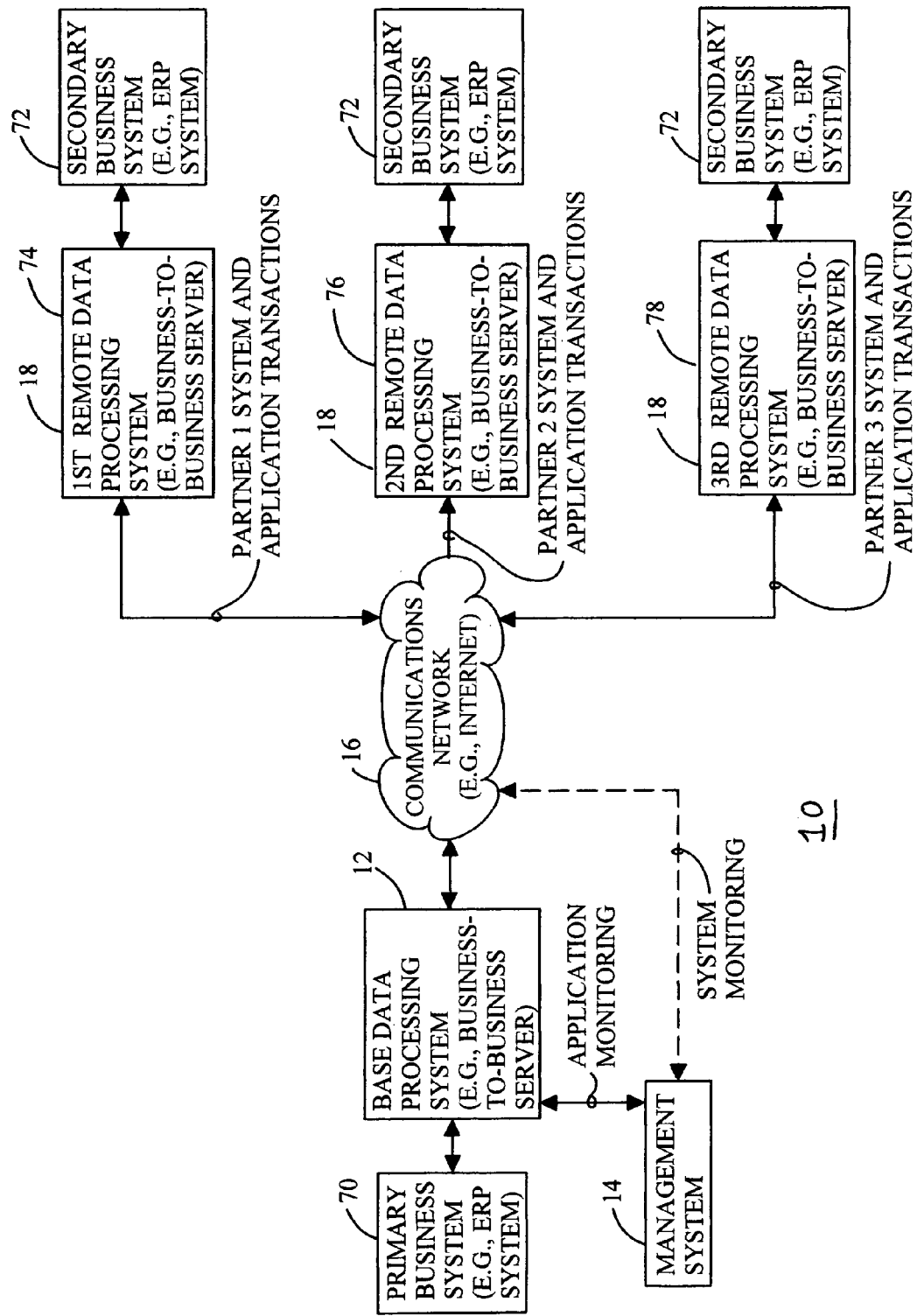
FIG. 1 is a block diagram of a business-to-business system including a management system in accordance with the invention.

In accordance with the invention, a business-to-business system 10 of FIG. 1 includes a primary business system 70 coupled to a base data processing system 12. The base data processing system 12 communicates with one or more remote data processing systems 18 via a communications network 16 (e.g., a virtual private network on the Internet). Each remote data processing system 18 is coupled to a corresponding secondary business system 72. A management system 14 is coupled to the communications network 16, the base data processing system 12, or both. The management system 14 facilitates one or more of the following activities: remotely monitoring technical parameters and remotely altering technical parameters of one or more remote data processing systems 18.

A technical parameter may define a configuration of a data processing system, which generically refers to the base data processing system 12, the remote data processing system 18, or both. The configuration or configuration data defines technical characteristics (e.g., specifications), hardware characteristics, and software characteristics of a data processing system. In one embodiment, a technical parameter generally refers to one or more of the following: configuration data on the base data processing system 12, configuration data on one or more remote data processing systems 18, software configuration data, hardware configuration data, a value of a variable used in data processing, a value of a constant used in data processing, an installed version of a base software module, an installed version of a remote software module, an installed type of base software module, an installed type of remote software module, and operational status data. The software configuration data may refer to the software configuration of the base data processing system 12 and/or the software configuration one or more remote data processing systems 18 of a trading group. The hardware configuration data may refer to the hardware configuration of the base data processing system 12 and/or the hardware configuration of one or more remote data processing systems 18 of a trading group.

A technical parameter may define an operational status of a data processing system. Operational status data may relate to a performance status, an occurrence of an alarm condition, a performance of a data processing system, a performance of a software component of a data processing system, a performance of a hardware component of a data processing system, or any combination of the foregoing items.

The primary business system 70 may exchange transactional data with one or more secondary business systems 72 via the communications network 16 to conduct a transaction (e.g., business-to-business transaction). To this end, the base data processing system 12 and at least one remote data processing system 18 act as intermediaries to facilitate communications via the communications network 16. For example, the base data processing system 12 may convert transactional data from the primary business system 70 into an extensible mark-up language document (XML), a hyper-text mark-up language (HTML) document, or any other suitable data structure for transmission of transactional data over the communications network 16. Similarly, the remote data processing system 18 may convert the received transactional data from the base data processing system 12 from an XML document, an HMTL document, or another suitable data structure into a data protocol or format compatible with the secondary business system 72. The transactional data (e.g., XML document) may be transmitted as one or more data packets over the communications network 16, consistent with the hypertext transfer protocol (HTTP), hypertext transfer protocol, secure (HTTPS), or any other suitable data protocol. HTTP and HTTPS define how data messages are formatted and transmitted, for example.

The primary business system 70 may manage transactional data or other data relevant to the business operations of a primary business entity. For example, the primary business system 70 may represent an enterprise resource planning system. An enterprise resource planning system refers to a computer system that may integrate one or more of the following business functions of an entity: manufacturing, accounting, management, purchasing, inventory control, and engineering. The base data processing system 12 may represent the business-to-business server of a primary business entity.

One or more secondary business systems 72 may manage transactional data or other data relevant to the business operations of at least one secondary business entity. Each secondary business system 72 may represent an enterprise resource planning system or another computer-related tool for managing a business entity. The primary business entity or an affiliate may be allocated at least one of the responsibilities of monitoring, maintaining, troubleshooting, and upgrading the software of the remote data processing systems 18. Although the remote data processing systems 18 may be controlled technically by a secondary business entity or a number of different secondary business entities, distinct from the primary business entity, the secondary business entities may delegate one or more of the aforementioned responsibilities to the primary business entity. The management system 14 supports such a delegation or allocation of monitoring, maintaining, troubleshooting, and upgrading from a single site.

The base data processing system 12 may engage in a transaction with one or more remote data processing systems 18 over the communications network 16. Although any number of remote data processing systems 18 may be used to practice the invention, the remote data processing systems 18 of FIG. 1 may be designated as a first remote data processing system 74, a second remote data processing system 76, and a third remote data processing system 78. Further, the first, second and third remote data processing systems (74, 76, and 78) may be affiliated with a first business entity, a second business entity, and a third business entity, respectively. The first business entity, the second business entity, and the third business entity represent secondary business entities, whereas a business entity of the base data processing system 12 represents the primary business entity.

The management system 14 may monitor a transaction or communication between the base data processing system 12 and any remote data processing system 18; particularly with respect to the maintenance and functionality of application software of a base data processing system 12 and the remote data processing systems 18. Further, the management system 14 may monitor system-level communications or network-level communications between the base data processing system 12 and one or more remote data processing systems 18 to ensure reliable communications and a fault-tolerant environment.

The management system 14 (e.g., monitor 36 of FIG. 2) supports remote monitoring of the following attributes of remote data processing systems 18: (1) system monitoring of one or more interactions between the base data processing system 12 and the remote data processing system 18 via the communications network 16; (2) application monitoring of application software of the base data processing system 12, the remote data processing system 18, or both. System monitoring refers to monitoring of one or more system components that support application software (e.g., business-to-business application software). A system component refers to any software or hardware component that supports application software. A hardware component may include functionality between hardware components and functionality of individual hardware components, which may include a storage device (e.g., hard drive of a server), a server, a data manager, a database, and brokering architecture components, among other items. A base data processing system 12 or a remote data processing system 18 may comprise a server (e.g., a business-to-business server). Brokering architecture may refer to any intermediate data processing system that interfaces one business system (e.g., primary business system 70) to a communications network 16 to support communications of data messages to another business system (e.g., a secondary business system 72) of a trading partner. The remote data processing system 18 or the base data processing system 12 represents an intermediate data processing system.

Applications monitoring refers to the monitoring of a software application (e.g., a software module), and may extend to the transactions that the software application supports. An active remote software module 60 (FIG. 2) or an active base software module 22 (FIG. 2) may represent applications software or a business-to-business software application.

The management system 14 supports remote monitoring, remote configuration, or both of software components of the remote data processing system 18. In one embodiment, the management system 14 allows a user or service provider to add, delete, or modify the software features of each remote data processing system 18 without requiring a person or technician to be at the location of the remote data processing system 18 where the software changes are proposed or being made. The management system 14 is particularly well suited for configuring a group of remote data processing systems 18 to promote technical compatibility and to efficiently troubleshoot problems. For example, the management system 14 may reduce travel expenses that might otherwise be necessary to upgrade remote data processing systems 18 of different trading partners, which may be widely geographically dispersed. A trading group refers to a set of trading partners (i.e., business entities) that exchange information with each other via a communications network to conduct a transaction or otherwise support business-to-business commerce.

Figure 2:
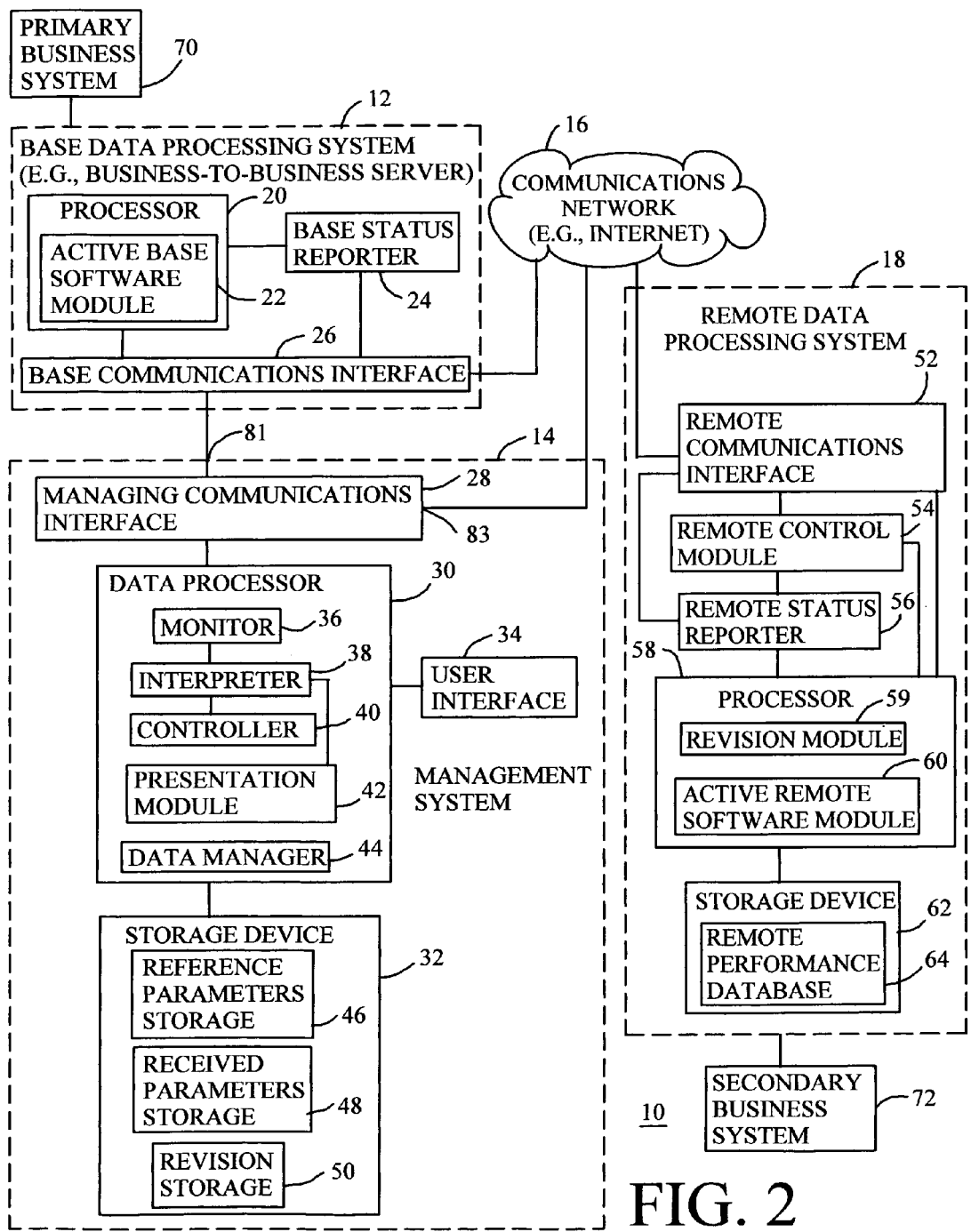
FIG. 2 is a block diagram of the business-to-business communications system in greater detail than FIG. 1.

FIG. 2 shows an illustrative example of components that may be used to practice the configuration of FIG. 1. Like reference numbers in FIG. 1 and FIG. 2 indicate like elements.

The base data processing system 12 may refer to a business-to-business server or another computer intermediary that provides a communications interface between a primary business system 70 and a communications network 16. The base data processing system 12 may include a processor 20 in communication with a base status reporter 24 and a base communications interface 26. The lines interconnecting the components of the base data processing system 12 may represent logical data paths, physical data paths, or both.

The processor 20 may execute an active base software module 22, which may be stored in a storage device (e.g., memory). For example, the active base software module 22 may support an electronic transaction with a trading partner with a complementary active remote software module 60 via a communications network 16. An active base software module 22 refers to any software module that is installed in the base data processing system 12 and activated for use. Similarly, an active remote software module 60 refers to any software module or collection of software components that are installed in the remote data processing system 18 and activated for use. The base status reporter 24 may provide a report message on technical parameters (e.g., operational status or configuration data) pertaining to the base data processing system 12 or any of its constituent components. The base communications interface 26 supports communications between one or more of the following: (1) the management system 14 and the remote data processing system 18 and (2) the primary business system 70 and at least one secondary business system 72.

The management system 14 includes a managing communications interface 28 that is a coupled to a data processor 30. In turn, the data processor 30 is coupled to a user interface 34 and a storage device 32. The lines interconnecting the components of the management system 14 may indicate logical data paths between the components, physical data paths between the components, or both.

The managing communications interface 28 may include a first port 81 for communicating with a base data processing system 12 and a second port 83 for communicating with the communications network 16. The traffic at the second port 83 may not be filtered by any firewall associated with the base data processing system 12 to allow greater flexibility in surveillance and monitoring of the traffic on the communications network 16 or activities at the remote data processing system 18.

In one embodiment, the data processor 30 includes a monitor 36, an interpreter 38, a controller 40, a presentation module 42, and a data manager 44. The monitor 36 may receive data from or transmit data to the managing communications interface 28. The received data may originate from the base data processing system 12 or one or more remote data processing systems 18 via the communications network 16.

The interpreter 38 extracts or accepts technical parameter data or processed technical parameter data from the monitor 36. The interpreter 38 refers to an evaluator that interprets or evaluates the monitored technical parameter data to determine whether and how the monitored technical parameter data is relevant to operational status, maintenance, revision, or upgrading of a data processing system within the business-to-business system 10. The interpreter 38 may establish alarm criteria that represents the need for undergoing an update procedure or a new feature upgrade of the active remote software module 60, for example. The interpreter 38 may forward interpreted information to the presentation module 42.

The presentation module 42 prepares information for presentation by a user interface 34, such as a graphical user interface. For example the presentation module 42 may arrange the information as a chart by identity of different trading partners or different transactions or a presentation on the user interface 34.

The data manager 44 may communicate with the managing communications interface 28, a storage device 32, interpreter 38, and other components of the data processor 30, where necessary or appropriate. The storage device 32 stores one or more of the following storage allocations: a reference parameters storage 46, a received parameters storage 48, and a revision storage 50. The data manager 44 (e.g., database manager) manages query, storage and retrieval operations from one or more storage allocations (e.g., databases, dynamically defined data storage, or dedicated data storage) stored within the storage device 32.

The reference parameters storage 46 stores the reference technical parameters on the remote data processing systems 18. For example, the reference technical parameters may include the following information on each remote data processing system 18: a remote identifier (e.g., server identifier), hardware configuration data, software configuration data, a software module identifier, a software version identifier of each software module, operational status data, and any other data relevant to the proper technical operation of the remote data processing system 18 for communications and conducting transactions over the communications network 16. Each remote data processing system 18 may be identified by a remote identifier to support tracking and management of different configurations at the different remote data processing systems of a trading group or multiple trading groups. The remote data processing system 18 of the same trading group may be assigned a group identifier to facilitate maintenance of compatibility for configuration data associated with a base data processing system 12 and at least one remote data processing system 18, affiliated with the trading group.

The received parameter storage 48 contains received technical parameters on the actual technical parameters (e.g., actual configurations or actual operational parameters) of one or more remote data processing systems 18. In contrast, the reference parameters contain reference data on the remote data processing system 18. The reference technical parameters may define a reference or desired configuration of a corresponding remote identifier or trading group identifier.

In an alternative embodiment, the received parameter storage 48 may be omitted from the storage device 32 and management of technical parameters may be tracked manually by one or more workers and entered into the user interface 34. For example, a user interface 34 may support the presentation of a remote technical parameter of a remote data processing system via a communications network and may allow a user to change the presented remote technical parameter without storing it in the received parameter storage 48. The user may refer to the reference parameters storage 46 to determine the appropriate change to the presented remote technical parameter.

The storage device 32 preferably includes a revision storage 50 for storing revision data on one or more data processing systems (e.g., remote data processing system 18 and the base processing system 12). The revision data includes one or more of the following: a software module for a new feature, revision or update of a data processing system, a software component for a new feature, revision or update of a data processing system, a preferential value of the constant or variable for a data processing system, an upgrade remote software module, a desired version (e.g., latest or new version) of a remote software module, an upgrade base software module, a desired version of a base software module, a desired type of a base software module, and a desired type of a remote software module. The data processor 30 may select and extract a requisite revision (e.g., a desired upgrade module) from the revision storage 50 based on a comparison of the received technical parameters to reference technical parameters in the reference parameters storage 46. The particular revision may be selected from the revision storage 50 to support maintenance, troubleshooting, or upgrading of the business-to-business system 10. The data manager 44 forwards the particular selected revision data (e.g., upgrade software module, desired version, or new version of the software module) of the software module to the managing communications interface 28. In turn, the managing communications interface 28 sends the selected revision data (e.g., upgrade software module) to one or more remote data processing systems 18 that require a revision (e.g., an upgrade or a desired version) via the communications network 16.

The communications network 16 may refer to the Internet, an intranet, a virtual private network, a dedicated communications line, a public switched telephone network (PSTN), a data packet network, a virtual communications path, a physical communications path, or another telecommunications link.

Each remote data processing system 18 may include a remote communications interface 52 that supports communications with the managing communications interface 28 via the communications network 16. Each remote communications interface 52 may maintain a remote identifier (e.g., a remote station identifier) for facilitating selective communications over the communications network 16. The remote communications interface supports communications between (1) the base data processing system 12 and a particular one of the remote processing systems 18 or (2) a management system 14 and a particular one of remote data processing systems 18 (e.g., first remote data processing system 74 of FIG. 1).

In one embodiment, the remote data processing system 18 comprises a remote communications interface 52 that communicates with a remote control module 54, a remote status reporter 56, or a processor 58. The processor 58 is coupled to a storage device 62. The processor 58 may contain a revision module 59, an active remote software module 60, and an interface for communicating to a storage device 62. The remote control module 54 may supervise the installation of a revision sent from the management system 14 to the remote data processing system 18. For example, the remote control module 54 may schedule the installation of the revision for a suitable time. The suitable time may be established by coordinating the upgrade with ongoing transactions such that a ongoing transaction between the remote data processing system 18 and the base data processing system 12 is not interrupted by the upgrade of the software module.

In one embodiment, the user may manually track the hardware of a particular one of the remote data processing systems 18 to determine whether the hardware is adequate to support the revision. In an alternate embodiment, the remote status reporter 56 may track the applicable hardware and send a data message to the management system 14 indicating whether a hardware upgrade is necessary or not for a particular remote data processing system 18. The hardware upgrade may require the dispatch of a technician to the remote site where the particular one of the remote data processing systems 18 resides.

The remote status reporter 56 may provide general status information on the technical parameters of the remote data processing system 18. The technical parameters may include the technical configuration (e.g., specifications), operational status, or both of the remote data processing system 18. Operational parameters include performance data, alarm data or application functionality of the remote data processing system 18. The remote status reporter 56 may monitor the hardware operations, software operations or both of the remote data processing system 18 to provide the management system 14 with technical parameter data for archiving in a remote performance database 64 or transmission to the management system 14. The remote performance database 64 may be stored in the storage device 62 for subsequent transmission to the management system 14 for display via the user interface 34 or archiving in the received parameters storage 48.

The remote status reporter 56 provides a status report which includes information on at least one technical parameter of the remote data processing system 18 along with a remote identifier to identify the particular one of the remote data processing systems 18. The remote data processing system 18 includes one or more active or installed remote software modules 60.

In one embodiment, the user of the management system 14 or another person tracks the identity of one or more active software modules 60 and/or software components installed on each remote data processing system. The remote configuration of a remote data processing system may be tracked manually and entered into the management system 14. The management system 14 may compare the entered remote configuration into a reference configuration to determine if an update is necessary.

In another embodiment, the remote status reporter 56 can provide an inventory of the identity of the active or installed remote software modules 60 as received technical parameter data. Upon receipt of the inventory data, the management system 14 may determine whether a revision of the remote software module 60 or the remote data processing system 18 is required. An inventory may refer to a list of installed remote software modules 60 by module identifier, for example.

The user interface 34 may be used to display the status report that the remote status reporter 56 transmits. The presentation module 42 may format the received status report to inform a user of functional problems or operational problems in the remote data processing system 18 that may require attention. The status report may include a remote identifier to identify the particular problematic one of the remote data processing systems 18. Accordingly, if the management system 14 is monitored by a human or live operator, the operator may well represent a single point of network service and operations management for all of the trading partners of the business-to-business system 10.

The foregoing revision functionality of the base data processing system 12 and the management system 14 supports efficient software upgrades and troubleshooting of remote data processing systems 18 without the need to dispatch a technician to various geographic locations (e.g., sundry cities) of different trading partners. Thus, the configuration is well suited for trading partners that are widely geographically dispersed such that traveling expenses of technicians and time involved in the upgrade may be greatly reduced over manual upgrades or troubleshooting procedures that would otherwise involve a technician personally loading software into one or more remote data processing systems 18 via an optical media such as a compact-disk, read-only-memory (CD ROM disk), a magnetic tape, a floppy disk or a removable disk drive. Instead, the management system 14 supports revision of the business-to-business system 10 via the communications network 16 without the need for extensive travel to different sites of the trading partners.

Figure 3:
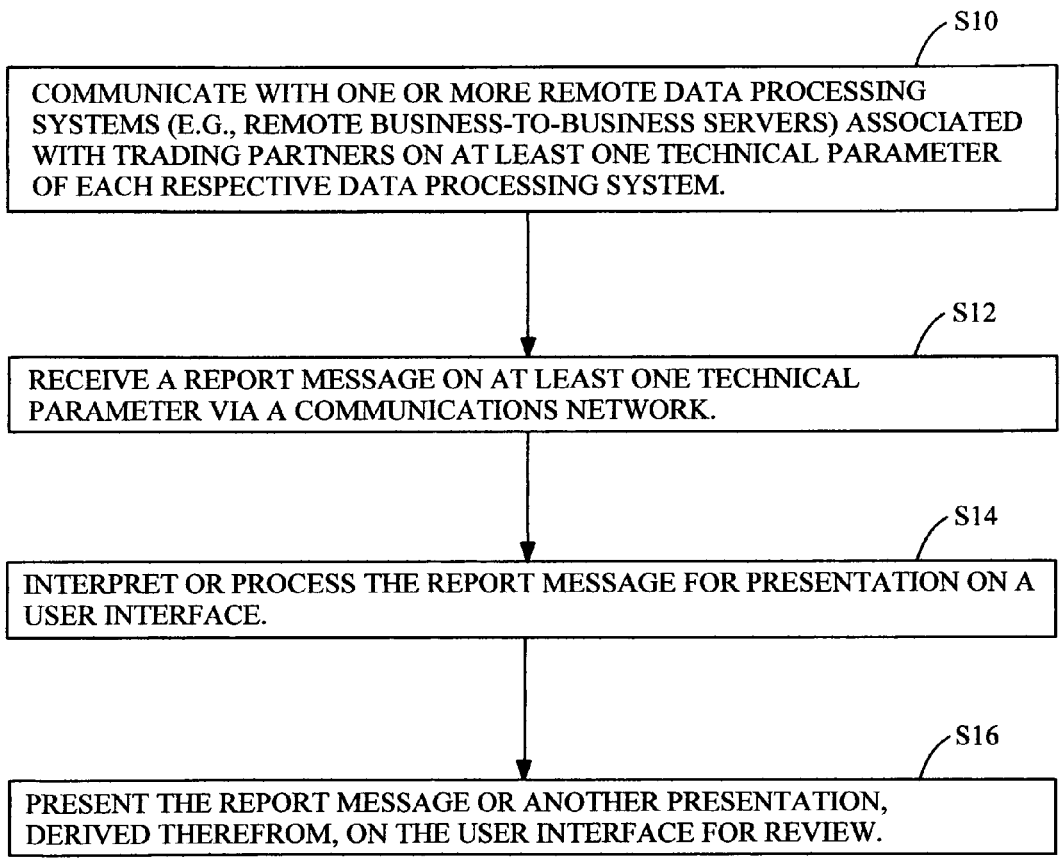
FIG. 3 is a flow chart of a method for monitoring a remote data processing system or systems from a management system in accordance with the invention.

FIG. 3 is a block diagram of a method for monitoring the operation of one or more remote data processing systems 18 via a communications network 16. The management system 14 may support the monitoring operation of FIG. 3. The method of FIG. 3 starts in step S10.

In step S10, the management system 14 or the base data processing system 12 polls or communicates with one or more remote data processing systems 18 via the communications network 16. For example, the management system 14 may transmit a data message query to remote business-to-business servers as the remote data processing systems 18. Each remote data processing system 18 may be associated with a different trading partner. The polling may seek information on at least one technical parameter of software, hardware or both of each respective remote data processing system 18. The technical parameter may comprise a configuration or technical characteristic of a particular remote data processing system 18 or an operational status of a particular remote processing data system 18. For example, the operational status may represent the status of transactional data that is provided by a secondary business system 72. Examples of operational status data 108 are illustrated in FIG. 5, which will be described later.

In step S12, the management system 14 or the managing communications interface 28 receives a report message on the at least one technical parameter via a communications network 16. For example the remote status reporter 56 may obtain technical parameters (e.g., operational status data) of the remote software module 60 of the remote data processing system 18. After gathering the technical parameter data the remote status reporter 56 may forward the technical parameter data to the remote communications interface 52, where the remote communications interface 52 conveys the technical parameter data to the managing communications interface 28 or the base communications interface 26 via the communications network 16. In one example, the base data processing system 12 acts as an intermediary in the communications path for the transfer of the technical parameter data or report message between the remote data processing system 18 and the management system 14.

At the management system 14 in step S14, the data processor 30 or the interpreter 38 interprets or processes the report message or the underlying technical parameter data. The interpreter 38 may prepare or organize the technical parameter data for one or more remote data processing systems 18 of a trading group. The processing of the interpreter 38 may include preparing, sorting and filtering the report message for a presentation on a user interface 34. For example, the interpreter 38 may filter duplicative or low-priority received report messages from different remote data processing systems 18. The information may be displayed at the user interface 34 (e.g., graphical user interface 34) by the identity of different trading partners having associated corresponding remote data processing systems 18.

In one configuration, the interpreter 38 may organize the technical parameter data for displaying data one a user interface 34 based upon a defined alarm or the occurrence of a triggering event. The defined alarm may be established where a pre-designated condition is established as a trigger for displaying the alarm or alerting a user at the user interface 34. In one example, the pre-designated condition may include the occurrence of a particular operational status data associated with a transaction, such as the failure to execute a particular transaction or class of transactions. In another example, the defined alarm may be associated with a malfunction, a problem or another operational status of hardware, a software module, or another component of a data processing system.

In step S16, the report message or technical parameter data is presented on a user interface 34 for review. The technical parameter data or report message presented to the user may afford the user the opportunity to monitor, maintain, troubleshoot, and upgrade one or more remote data processing systems 18, the base data processing system 12, or any combination of the foregoing items. The presentation of the technical parameter data supports the coordination of maintenance, upgrade, and trouble-shooting procedures for a business-to-business system 10 of a trading group.

For example, a user may authorize a manual upgrade or revision of software (e.g., a remote software module 60) in a remote data processing system 18, the base data processing system, 12, or both. The user may resolve a compatibility problem or engage in other troubleshooting action to enhance reliability in the communications network 16 based on an interpretation of the report message or other technical parameter data provided by the remote status reporter 56. The user may conveniently conduct such monitoring, maintenance, and troubleshooting remotely from a management system 145 at a single site, regardless of the user's ability to personally or physically inspect sites of the remote data processing systems 18.

Figure 4:
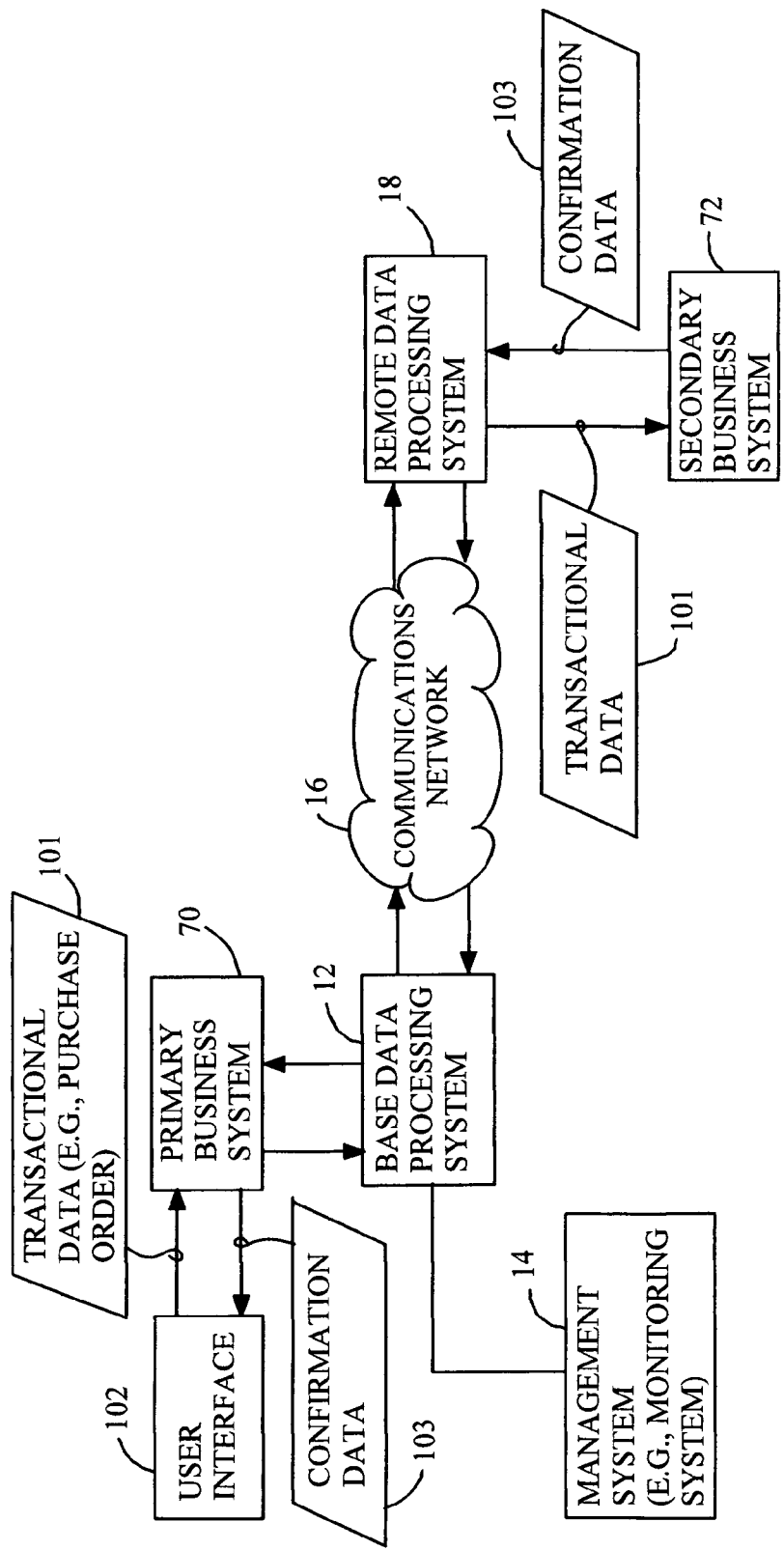
FIG. 4 is a block diagram of a business-to-business system that supports monitoring of transactional data and confirmation data from a user interface in accordance with the invention.

FIG. 4 shows an illustrative exchange of data in a business-to-business system 10 in accordance with the invention. Like reference numbers in FIG. 4 and FIG. 1 indicate like elements.

A user interface 102 is coupled to the primary business system 70. In turn, the primary business system 70 is coupled to a base data processing system 12. The base data processing system 12 communicates with a remote data processing system 18 via a communications network 16. The remote data processing system 18 is coupled to a secondary business system 72. The management system 14 (e.g., a monitoring system) is coupled to the base data processing system 12 for monitoring the status of one or more of the following: confirmation data 103, transactional data 101, a software module of a data processing system, and a component of the remote data processing system 18.

The user interface 102 supports monitoring of the system on a transactional or business level. For example, the user interface 102 may allow a user to enter or approve transactional data 101 associated with the primary business system 70. The primary business system 70 interacts with the secondary business system 72 to convey or exchange the transactional data 101 over the communications network 16. For example, the primary business system 70 may send transactional data 101 to the secondary business system 72 via the communications network 16. The secondary business system 72 may generate confirmation data 103 or an acknowledgement upon receipt of the transactional data 101, successful execution of the transactional data 101, or both. If a communications fault or another problem is present in the business-to-business system of FIG. 4, the primary business system 70 may not receive the confirmation data 103.

At the user interface 102 or at the management system 14, a user may monitor and review transactional data 101 and associated confirmation data 103 on the user interface 102 to detect problems at a business level or transactional level. In general, only the party entering transactional data 101 is permitted to change the transactional data 101 to resolve a transactional problem so as to avoid deletion, corruption, or unwanted changes to the transaction underlying the transaction data. If a problem is identified, a management system 14 may provide a technical analysis of the problem in greater detail than that available to the user interface 102. For example, the technical analysis may include the presentation of applicable error codes.

FIG. 5 provides a chart of a representation that a management system 14 may provide to a user for reviewing the transactions of a group of trading partners in a trading group. For example, once a user at a user interface 102 of FIG. 4 reports a problem, a technician may display the representation of FIG. 5 at the management system to facilitate trouble-shooting. The first column represents trading partner identifiers 104. In the example shown, the trading partner identifiers 104 refer to a first trading partner 109, a second trading partner 110, and a third trading partner 111 through an Nth trading partner 112. The trading partners may include a primary business entity and a secondary business entities as previously described in conjunction with FIG. 1.

The second column refers to transaction identifiers 105. Each transaction identifier 105 refers to a symbol, a code, or a number that represents a unique identifier to distinguish one transaction from another. The transaction identifiers 105 may include revision codes, if the same transaction is attempted multiple times.

The third column contains incoming times 106. The incoming time 106 refers to a time and date in which the base data processing system 12 receives outgoing transaction data from the primary business system 70 for transmission to the remote data processing system 18 over the communications network 16. Alternatively, the incoming time 106 refers to the time and date in which the primary business system 70 sends the transactional data 101 to the base data processing system 12 for later transmission to the remote data processing system 18 via the communications network 16.

The fourth column represents outgoing time 107. The outgoing time 107 refers the time when the base data processing system 12 transmits the received outgoing data message to the remote data processing system (18 or 118). A time difference (which may be designated a first time difference) between the incoming time and the outgoing time may provide an indication of the processing rate or data throughput of the base data processing system 12.

In one embodiment, the remote data processing system (18 or 118) tracks a remote incoming time as the receipt of the transmitted outgoing data message via the communications network 16. Further, the remote data processing system (18 or 118) tracks a remote outgoing time as the time of transmission of the data message to the secondary business system 72. A time difference (which may be designated a second time difference) between the remote incoming time and the remote outgoing time may provide an indication of the processing rate of the data throughput of the remote data processing system (18 or 118). Similarly, the time difference (which may be called the third time difference) between the outgoing time and the remote incoming time provides measure of the throughput of the communications network 16.

The last column of FIG. 5 represents operational status data 108. The operational status data 108 may be derived from or expressed as confirmation data 103 at the transactional level. Alternatively, the operational status data 108 may be derived from the flow of the transactional data or another data message at various checkpoints (e.g., incoming time measurement point and outgoing time measurement points) in the business-to-business system 10. Although a myriad of possible status representations exists, as shown in FIG. 5 the operational status data 108 includes one or more of the following states: transaction complete, transactional data not received, transactional data corrupt, remote data processing system 18 is down, communications network 16 is down, and secondary business system 72 is down, an installed remote software module 160 or a component of the remote data processing system 18 is not operational.

In one embodiment, the secondary business system 72 generates and sends acknowledgment data as the status data in response to the successful receipt (e.g., received and detectable without a significant error rate that detracts from data reliability) of transactional data 101. The acknowledgement data may be sent to a business entity identifier of the base data processing system 12 that is associated with the transactional data 101. In another embodiment, the remote data processing system 18 generates acknowledgement data or sends feedback data as the status data to the base processing system 12. The management system 14 may review the acknowledgement data or the feedback data to provide a fault analysis, a troubleshooting analysis, or the like.

Figure 6:
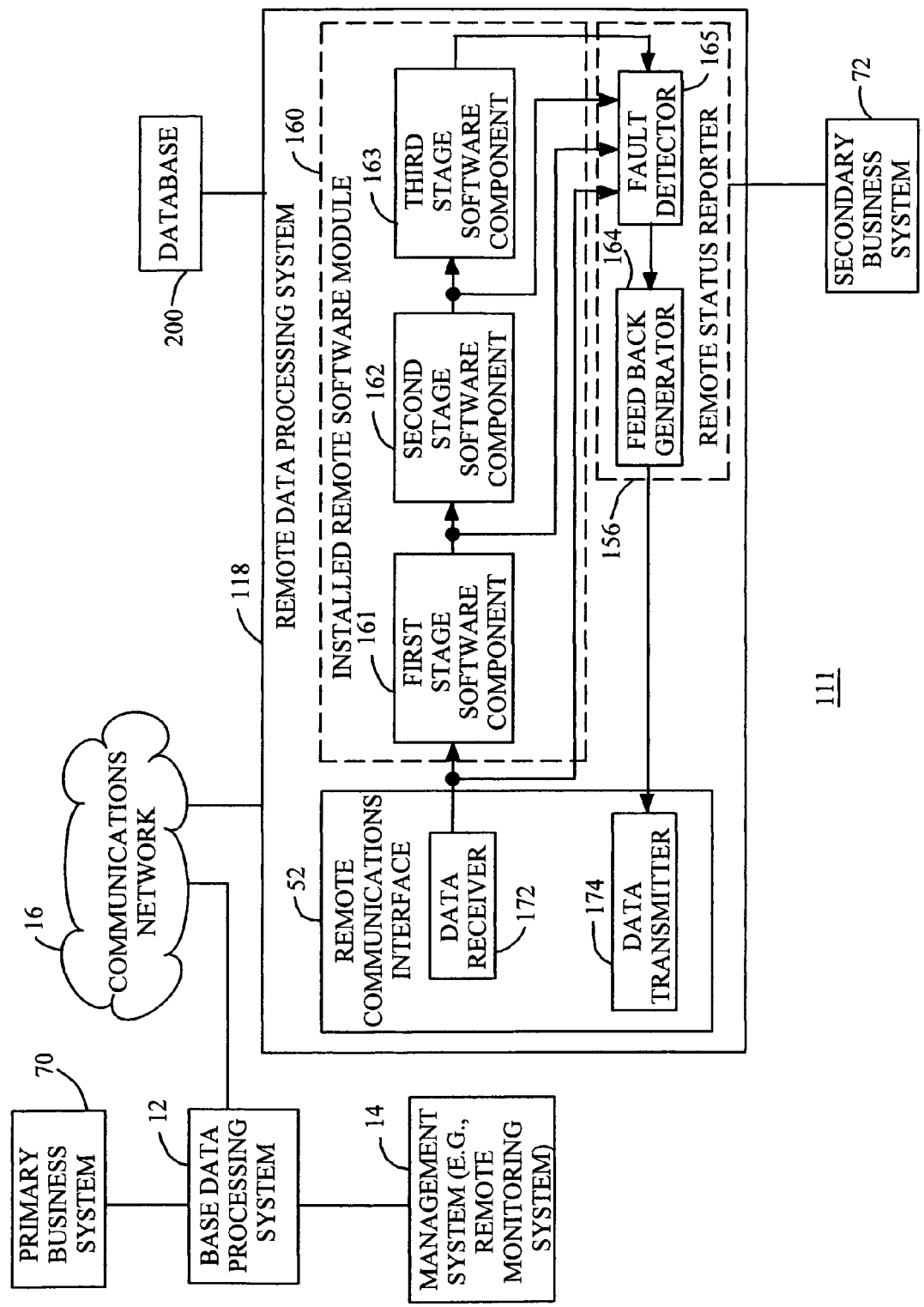
FIG. 6 is a block diagram that illustrates an alternate embodiment of a remote data processing system in accordance with the invention.

FIG. 6 is a block diagram of an alternate embodiment of a remote data processing system 118 that supports one or more fault analysis procedures in accordance with the invention. The remote data processing system 118 may convey a report message (e.g., fault analysis data) to remote management system 14. Like reference numbers in FIG. 1 and FIG. 6 indicate like elements.

In FIG. 6, the primary business system 70 is coupled to base data processing system 12. The base data processing system 12 communicates with one or more remote data processing systems 118 via the communications network 16. In turn, each remote data processing system 118 is coupled to the secondary business system 72. The primary business system 70 and the secondary business system 72 may interact by using the base data processing system 12 and the remote data processing system 118 as intermediaries. The management system 14 monitors the base data processing system 12, the remote data processing system 118, or both.

The remote data processing system 118 of FIG. 6 differs from the remote data processing system 18 of FIG. 1 in the following respects. First, the remote data processing system 118 of FIG. 6 includes a multi-stage, remote software module 160, whereas the remote software module 60 may be single stage. Second, the remote status reporter 156 includes a fault detector 165 and a feedback generator 164.

Although the multi-stage, remote software module 160 may include any number of stages, in FIG. 6, three stages (161, 162, 163) are shown. The stages (161, 162, 163) are designated as a first stage software component 161, a second stage software component 162, and a third stage software component 163. The lines interconnecting the stages (161, 162, 163) indicate logical data paths, physical data paths, or both. The stages (161, 162, 163) are arranged in tandem or series such that transactional data 101 or another data message received from the base data processing system 12 via the communications network 16 is processed successively by each of the stages (161, 162, 163) or in some other defined order by one or more stages. For example, as shown in FIG. 4 and FIG. 6, transactional data 101 or another data message flows from an upstream position at data receiver 172 to a downstream positioned fault detector 165. During such a flow, the data flows from data receiver 172 to a logical node between data receiver 172 and stage 161 and flows therefrom through stages 161, 162 and 163 in succession until it reaches fault detector 165, assuming no faults occur along the way. During such flow of the data, the data does not retrace its path during the detecting process. Once one software stage has initiated or completed processing, the data message (e.g., transactional data or a derivative thereof), is typically passed on or handed off to the next software stage, unless the remote multi-stage software module 160 is not functioning appropriately or unless the processing of the next stage is not required.

The fault detector 165 detects whether the software module 160 is functioning appropriately by tapping into the logical data paths (or physical data paths) at logical nodes between the stages (161, 162, 163). As is readily apparent from FIG. 6, the fault detector 165 detects the presence of the data message at a logical node between the stages (161, 162, 163) without interrupting the flow of the data message through the stages (161, 162, 163) from one node to the next node. As shown in FIG. 6, the pathways from the fault detector 165 do not extend coincidentally with and along the lengths of the pathways that serially connect the data receiver 172, module 160 and stages 161-163 to one another. The fault detector 165 works by taking into account that the data is intended to flow successively from stage 161, to stage 162 and then to stage 163. Accordingly, if the data message (e.g., transactional data 101), its derivative, or its precursor is present at an earlier stage and absent at a later stage after the earlier stage has initiated or completed its processing, the fault detector 165 may determine that the software stage immediately following the last detected data message is at fault. The fault detector 165 may assign a stage identifier to distinguish one software stage from another and to identify a faulty software stage. Further, the fault detector 165 may associate a fault description (e.g., a fault code) with the stage identifier for transmission to the management system 14 or the base data processing system 12 via the communications network 16.

The fault detector 165 may archive its analysis or detected faults, stage identifiers, and fault descriptions in a database 200 associated with the remote data processing system 118. The remote data processing system 118 or the management system 14 may query the database and retrieve information from the database 200 to identify and solve technical problems. For example, the database 200 may contain a list of elements or components of the remote data processing system 118, and corresponding status data 108 on whether the components are active or operational. In one embodiment, the management system 14 determines if each remote data processing system 118 is active, operational, or responsive on a site-by-site basis by accessing a group of databases 200 associated with the different trading partners of a trading group.

The feedback generator 164 may be coupled to the fault detector 165. When the business-to-business system is fully functional, the feedback generator 164 may recirculate a status indicator (e.g., a dummy or known sequence bit stream) that is received from the base data processing system 12 by the data receiver 172. The feedback generator 164 may verify the presence of the status indicator at a last stage (e.g., third stage software component 163) of the remote software module 160. If the status indicator is present at the last stage, the feedback generator 164 may forward the status indicator or regenerate the status indicator for transmission back to base the data processing system 12 or the management system 14. The status indicator may be directed to the data transmitter 174 for transmission to the base data processing system 12 as an indicator that all of the stages of the remote software module 160 are functioning and the communications network 16 is operational.

The circulation of the status indicator flows from the base data processing system 12 to the remote data processing system 118 and then back to the base data processing system 12 for detection by the management system 14. The circulation may be referred to as a heart-beat indicator because the heart-beat indicator may be configured to be present when the business-to-business system 111 (e.g., trading system) is properly operating and responsive, or alive so to speak. The heart-beat indicator may represent a string of known symbols or a status indicator that is generated repetitively and coincident with a interval. An outbound heart-beat indicator from the base data processing system 12 is preferably followed by an identical inbound heart-beat indicator, thereafter, in a properly functioning system.

FIG. 6 primarily concerns the monitoring capabilities of the management system 14, as opposed to the control capabilities of the management system 14. Accordingly, in an alternate embodiment of FIG. 6, the management system 14 of FIG. 6 may be replaced by a remote monitoring system.

Once a technical problem is detected or discovered, the management system 14 may access the database 200 at the remote data processing system 118 to retrieve any error messages that the fault detector 165 or the remote status reporter 156 have logged and recorded in the database 200. The management system 14 may present error messages (e.g., error codes) to a user via a user interface 34 (e.g., graphical user interface), start the flow of error messages for receipt at the management system 14, and stop the receipt of error messages for reviewing at the management system 14. The management system 14 may view the transactions or operation of the remote software module 160 when the software module is operational. The management system 14 may instruct the remote data processing system 118 to reprocess a data message, transactional data, or other business data if an error occurs that might be resolved by such reprocessing.

The management system 14 may send a reset message or a restart message to reset or restart one or more of the following components of the remote data processing system 18: the first stage software component 161, the second stage software component 162, the third stage software component 163, and the remote software module 160. The management system 14 may also shut down a particular stage or stages of the remote software module 160 on a stage-by-stage basis, or otherwise. In practice, the remote data processing system (118 or 18) may include multiple installed software modules that are selectively enabled or disabled via the management system 14. An application program of the remote data processing system (18 or 118) may include one or more installed software modules or components thereof.

If the remote software module 160 or a stage remains non-responsive after the resetting or restarting, the management system 14 has the capability to do one or more of the following: (1) remotely change technical parameters associated with one or more remote software modules 160; (2) remotely change technical parameters associated with any software stage, (3) remotely upgrade a portion of a software module, (4) remotely upgrade an entire software module and (5) modify another software component via the communications network 16. The upgrading of a technical parameter may be preferred to upgrading an entire program or software module because of the lesser bandwidth or communication resources of the communications network 16 required to transmit technical parameter data than an entire program, for example. Moreover, technical parameters may be changed more quickly than more elaborate revisions because of the elimination of the need to transmit a software module or software component, followed by installation of the software module or component at the remote data processing system 118.

The forgoing control and management features of the management system 14 may facilitate ready replacement of corrupt data, incompatible program components, and remedying of software bugs. Software patches are readily and quickly distributed to all members of the trading group to solve certain problems.

Figure 7:
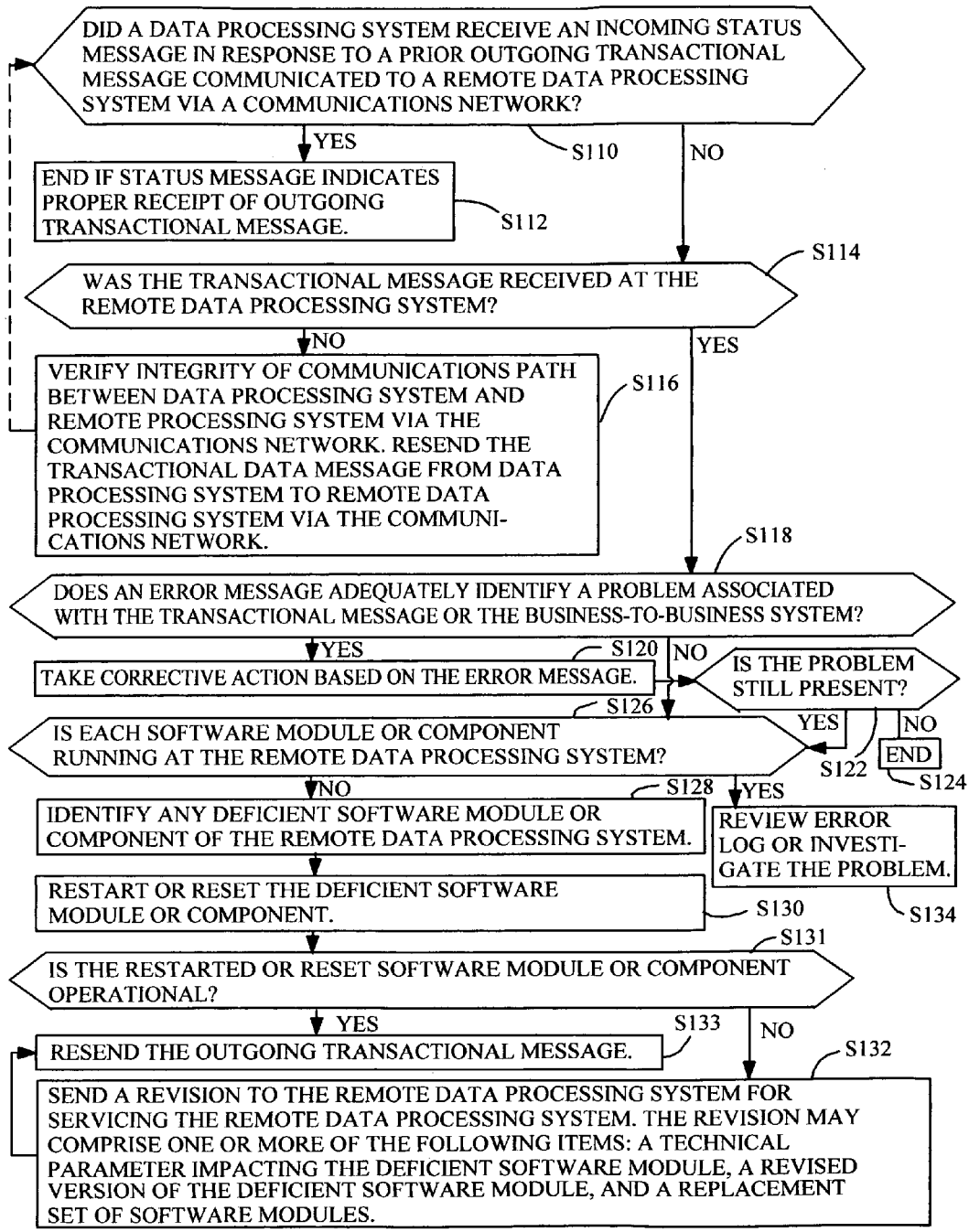
FIG. 7 is a flow chart of a method for conducting troubleshooting in the business-to-business system in accordance with the invention.

FIG. 7 shows a flow chart of a method for managing a business-to-business system, including troubleshooting of the business-to-business system. The method of FIG. 7 starts in step S110.

In step S110, a data processing system 12 or a management system 14 determines if the data processing system 12 received an incoming status message in response to a prior outgoing transactional data message communicated to a remote data processing system (18 or 118) via a communications network 16. If the data processing system 12 received an incoming status message, the method continues with step S112. However, if the data processing system 12 did not receive an incoming status message, the method continues with step S114.

In step S112, the method may end if the status message indicates proper receipt of an outgoing transactional message or compliance with the characteristics of a properly operating business-to-business system. Alternatively, an operator of the management system 14 may enter input to run diagnostic checks or other trouble-shooting procedures on the remote data processing system (18 or 118) or the data processing system 12.

In step S14, the data processing system 12 or the management system 14 determines if a transactional message was received at the remote data processing system (18 or 118) via the communications network 16. If the transactional message was received at the remote data processing system (18 or 118), the method continues with step S118. If the transactional message was not received at the remote data processing system (18 or 118), the method continues with step S116.

In step S116, the data processing system 12 or the management system 14 verifies the integrity of the communications path (i.e., a virtual or physical communications path) between the data processing system 12 and the remote data processing system (18 or 118) via the communications network 16. If the integrity of the communications path is established confirmedly, the originating data processing system 12 resends the transactional data message from the data processing system 12 to the remote data processing system (18 or 118) via the communications network 16. However, if the communications path is suspect or non-operational, the data processing system 12 may employ (e.g., switch over to) another communications network, transport mechanism, or another communications path within the communications network 16. After step S116, the method may continue with step S110 as indicated by the dashed arrow.

In step S118, the data processing system 12 or a user via a user interface 34 determines if an error message adequately identifies a problem associated with the transactional message or the business-to-business system. For example, an error message may refer to an error code that represents a corresponding problem of the data processing system 12, the remote data processing system (18 or 118), the communications network 16, or some other element (e.g., hardware component) of the business-to-business system.

If the error message adequately identifies a problem associated with the transactional data message, the remote data management system 14 may support corrective actions in step S120 to resolve the problem underlying the error message. For example, in step S120, the user may take corrective action via the user interface 34 of the management system 14 based upon the error message to address the problem with the business-to-business system.

In step S122, if the problem is still present after taking the corrective action of step S120, the method may continue with step S126. However, if the problem is not present and has been solved or resolved, then the method ends in step S124.

In step 126, the management system 14 determines if one or more software modules (60 or 160) or components are functioning properly. In the context of the remote data processing system 118 of FIG. 6, the management system determines if each software component (e.g., 161, 162, or 163) or software module 160 is operational at the remote data processing system 118. Each remote software module 160 may be organized into multiple stages, consistent with the configuration illustrated in FIG. 6. For example, the software module 160 may include the first stage software component 161, the second stage software component 162, and the third stage software component 163. The management system 14 transmits a status message and waits for receipt of feedback associated with the status message that indicates the status message successfully traversed one or more stages of the communications network 16 and the remote software module 160. Each software component (e.g., 161, 162, or 163) may represent a different program, subroutine, program module, or some other divisible portion of the remote software module 160. If each software module or component is running properly at the remote processing system 118, the method continues with step S134. If each software module or component is not running, the method continues with step S128. In step S134, the user may review an error log or investigate the problem.

In step S128, the management system 14 identifies any deficient software module or component thereof. For example, the fault detector 165 may sense the progress of the status message to determine the identity of the software component (e.g., 161, 162, or 163) that is malfunctioning or nonoperational. In one example, the identity of the software component may include one or more of the following: the first stage software component 161, the second stage software component 162, and the third stage software component 163.

In step S130 following step S128, the management system 14 restarts or resets one or more of the deficient software modules (e.g., 161, 162, or 163) based on the determined identity of step S128. The restarting or resetting represents an attempt to resolve the problem.

In step S131, the management system 14 determines whether the restarted or reset software module or component is operational. If the restarted or reset software module or component is operational, the method continues to step S133. However, if the restarted or reset software module or component is not operational, the method continues to step S132.

In step S133, the management system 14 instructs the base data processing system 12 to resend the outgoing transactional message. For example, the base data processing system 12 may retrieve the outgoing transactional message from a database (not shown) which stores outgoing data messages that are transmitted to one or more remote data processing systems 118.

In step S132, the management system 14 sends a revision to the remote data processing system 18 for servicing the remote data processing system. The revision may comprise one or more of the following items: a technical parameter impacting the deficient software module, a revised version of the deficient software module, a revised type of the deficient software module, a replacement set of software modules for the remote data processing system (18 or 118). The remote data processing system (18 or 118) may be upgraded or revised based on the receipt of one or more of the foregoing items. Similarly, the base data processing system 12 may be upgraded to solve a technical or communications problem or to retain compatibility with the software modules in a trading group. Such software modules of a trading group include one or more remote software modules 60 and a base software module 22 that is compatible with the remote software module 60.

Step S134 may follow step S126. The user of the management system 14 may review an error log associated with the business-to-business communications system or otherwise investigate the problem. If the problem is identified, the user may take corrective action which may resemble that of step S132, for example.

Figure 8:
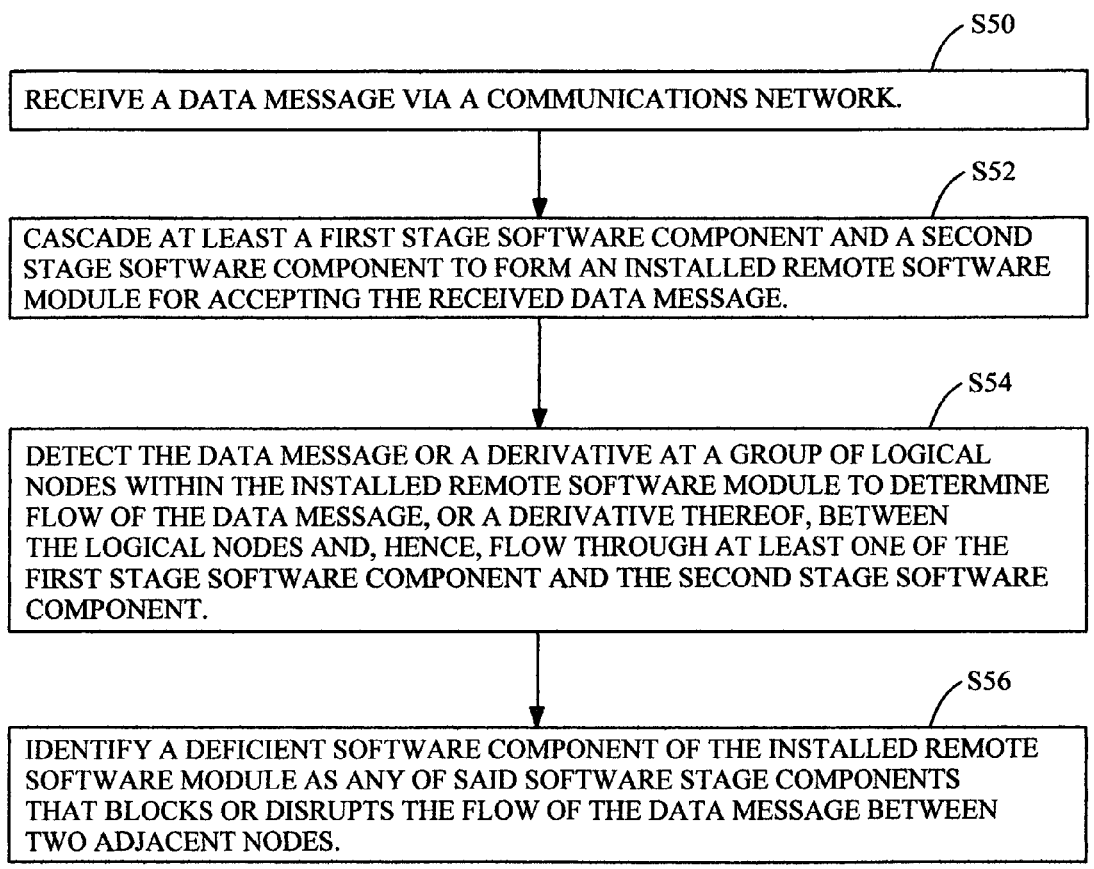
FIG. 8 is a flow chart of a method for identifying a deficient software component in the remote data processing system in accordance with the invention.

FIG. 8 shows a flow chart of a method for monitoring a remote data processing system (18 or 118). The method of FIG. 8 begins in step S50.

In step S50, a remote data processing system (18 or 118) or a receiver 172 receives a data message via a communications network 16. The data message may comprise transactional data, reference data, or both for communications between a base data processing system 12 and a remote data processing system (18 or 118).

In step S52, the remote data processing system (18 or 118) cascades at least a first stage software component and a second stage software component to form an installed remote software module 160 for accepting the received data message from the receiver 172. For example, the remote data processing system (18 or 118) may cascade three stages of software components or any other number of stages of software components.

In step S54, the remote data processing system (18 or 118) or the fault detector 165 detects the data message or a derivative at a group of logical nodes within the installed remote software module 160 to determine flow of the data message, or a derivative thereof, between the logical nodes. Hence, the fault detector 165 evaluates the data flow of the data message, or a derivative thereof, through at least one of the first stage software component and the second stage software component.

In step S56, the remote data processing system (18 or 118) or the fault detector 165 identifies a deficient software component of the installed remote software module 160 as any of said software stage components that blocks or disrupts the flow of the data message between two adjacent logical nodes. In one example, the fault detector 165 taps into a logical data path between the stages to detect whether each of the software component stages are functioning. During the tapping, the fault detector 165 may determine that a stage immediately following the last detected data message is at fault.

In one embodiment, the fault detector 165 assigns stage identifiers to distinguish one stage from another and to identify a faulty stage. Further, the fault detector 165 may associate a fault description with the stage identifier for transmission to a management system 14 via a communications network 16. The fault analysis may be archived in a fault analysis report in a database 200 associated with the remote processing system.

The foregoing method of FIG. 8 is well-suited for identifying a defective software component stage among the stages. The identification of a defective software component stage allows a user to target or narrow in on revising or replacing the defective software component to restore operational capabilities to the remote data processing system (18 or 118) in a prompt and efficient manner.

The method of FIG. 8 may be supplemented by a procedure that tests end-to-end communications continuity between the base data processing system 12 and the remote data processing system (18 or 118) over the communications network 16. Contemporaneously or noncontemporaneously with the steps of the method of FIG. 8, a status code is circulated between the base data processing system 12 and the remote data processing system (18 or 118) over the communications network 16.

The status code may be passed through various elements of the business-to-business system. The status code is distinct from the status of message of FIG. 8. The status code is routed from the base data processing system 12 via the communications network 16 to a remote data processing system (18 or 118) associated with the installed remote software module 160. The status code is routed from the remote data processing system (18 or 118) to the base data processing system 12 via the communications network 16 to indicate that the continuity of at least one logic data path traversed by the status code. The status code is passed from at least an input of a communications network 16 to an output of the communications network 16 to indicate that the communications network 16 is operational. The status code is passed from at least an input of the installed remote software module 160 to an output of the installed remote software module 160 to indicate that the installed remote software module 160 is operational.

Figure 9:
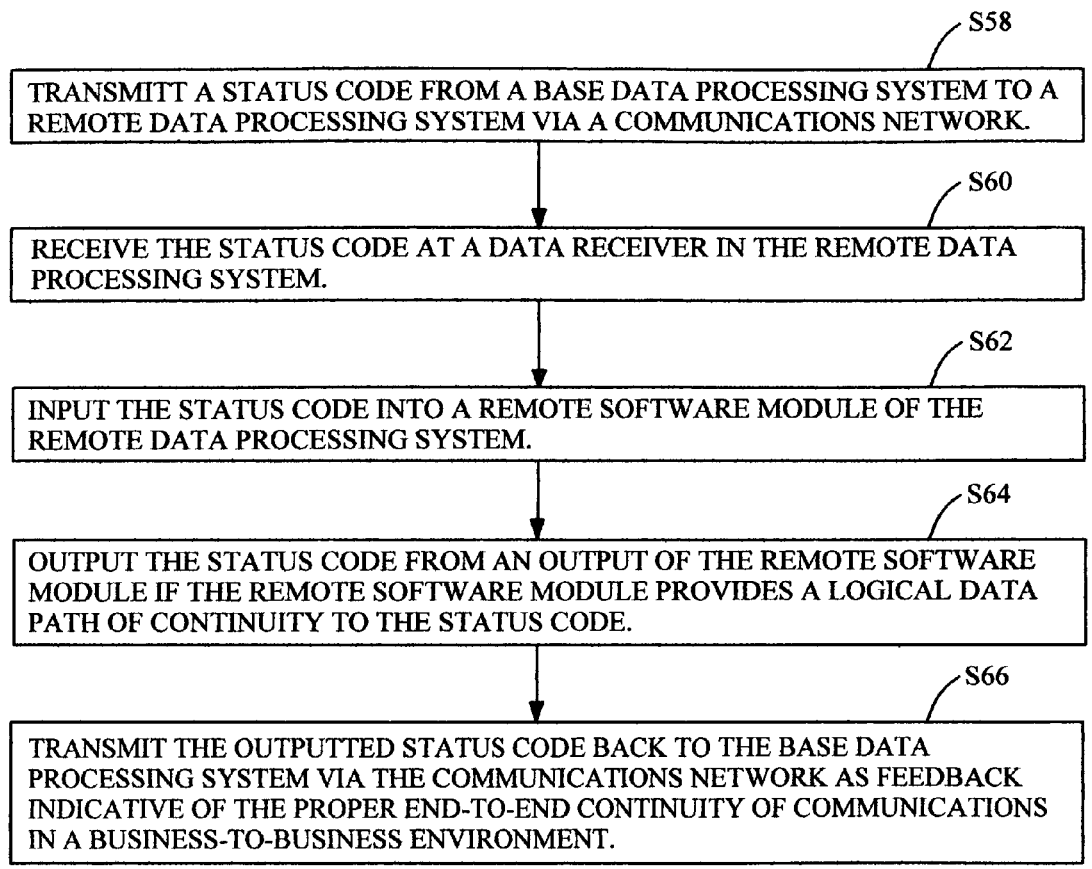
FIG. 9 is a flow chart of a method for monitoring a business-to-business system to determine proper end-to-end continuity of a communications path in accordance with the invention.

FIG. 9 illustrates a method of monitoring a business-to-business system. The method of FIG. 9 begins in step S58.

In step S58, a base data processing system 12 transmits a status code from a base data processing system 12 to a remote data processing system (18 or 118) via a communications network 16. The status code traverses a first logical data path (e.g., a virtual data path or a physical data path) over the communications network 16 between the base data processing system 12 and the remote data processing system (18 or 118) if continuity of the logical data path is present.

In step S60, a remote data processing system (18 or 118) receives the status code at a data receiver 172 in the remote data processing system (18 or 118) if continuity of the first logical data path is present.

In step S62, the remote data processing system (18 or 118) inputs the status code into a remote software module 160 of the remote data processing system (18 or 118).

In step S64, the remote data processing system (18 or 118) outputting the status code from an output of the remote software module 160 if the remote software module 160 provides a second logical data path of continuity to the status code.

In step S66, a transmitter 174 of the remote data processing system (18 or 118) transmits the outputted status code back to the base data processing system 12 via the communications network 16 as feedback indicative of the proper end-to-end continuity of communications in a business-to-business environment. The base data processing system 12, the management system 14 or both receive the transmitted status code if a third logical data path between the remote data processing system (18 or 118) and the base data processing system 12 is present.

Following step S60 and prior to step S66, the remote data processing system (18 or 118) may route the status code through a database 200 to test the logical flow and operation of the database 200. For example, the remote data processing system (18 or 118) may store the status code from an output of the remote software module 160 as a dummy transaction in the database 200. Following storage of the dummy transaction, the remote data processing system (18 or 118) retrieves the status code as the dummy transaction in the database 200 and feeds the retrieved status code for transmission to the base data processing system 12 if the database 200 provides a logical data path of continuity for the status code.

Accordingly, the management system 14 may use the method of FIG. 9 to monitor end-to-end continuity of a communications path in a business-to-business system. If the status code is sent from the base data processing system 12 or the management system 14 and not received back at the management system 14, the management system 14 is alerted to the presence of a communications fault or break in the communications path. The user of the management system 14 may be alerted via the user interface as to fault. Thus, the user of the management system 14 is able to engage in a wide array of sundry troubleshooting procedures to obviate or overcome the communications fault to business-to-business activity and transactions may continue with minimal disruption.

Figure 10:
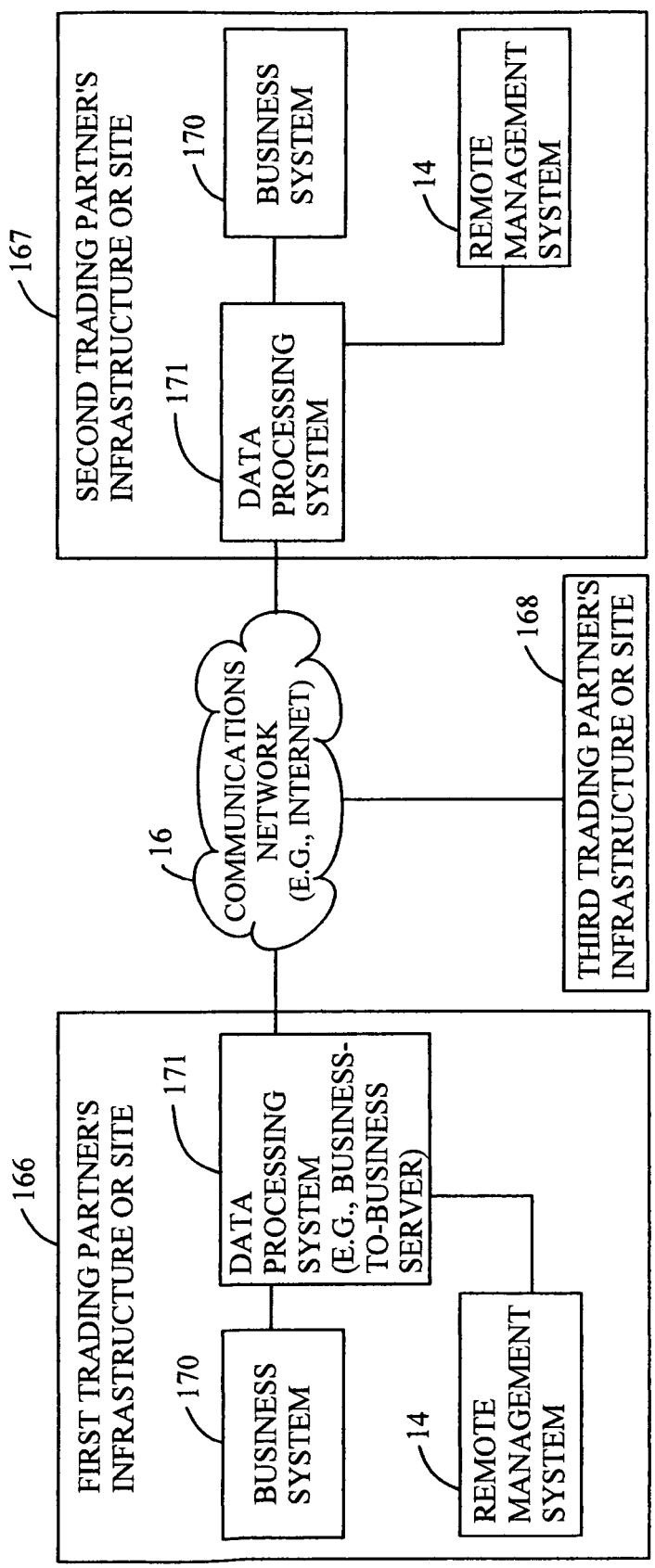
FIG. 10 is a block diagram that illustrates an alternate embodiment of a business-to-business system with multiple remote management systems at different sites in accordance with the invention.

FIG. 10 shows a hub and spoke arrangement of a business-to-business trading system 199 in accordance with the invention. The business-to-business trading system 199 applies to trading partners of a single trading group, for example. Although a first trading partner's infrastructure 166, a second trading partner's infrastructure 167, and a third trading partner's infrastructure 168 are shown in FIG. 10, in practice virtually any number of trading partners of a trading group may participate with their associated infrastructure. Each trading partner's infrastructure may be located at a different geographic site. A trading partner's infrastructure (166, 167 and 168) may comprise a data processing system 171 (e.g., a business-to-business server or a base data processing system 12) coupled to a business system 170 and a management system 14.

The management system 14 may be applied to the infrastructure of at least two different trading partners (e.g., at all trading partner sites). FIG. 10 differs from the configuration of FIG. 1 in that the management system 14 of FIG. 1 is controlled by and only present at a primary business entity or primary service provider. Here, the presence of multiple management systems 14 in the same trading group facilitates shared management of the business-to-business system 199 among the trading partners to distribute maintenance duties and operational expenses within the trading group. For example, the trading partners may agree to staff only one of the management systems 14 at any given time, during alternating time periods, or in accordance with a schedule to distribute labor costs among employees or workers affiliated with different trading partners. Further, even if the trading partners do not share the responsibilities of monitoring the system or updating software modules, the trading partners may assist one another to resolve technical problems from different perspectives available from management systems 14 distributed at different sites.

FIGS. 9 and 10 represent a flow chart of an update procedure for updating a remote software module (60 or 160) resident in a remote data processing system (18 or 118) remotely via a communications network 16 and the management system 14. The method of FIG. 11 and FIG. 12 begins in step S20.

In step S20, a management system 14 or a base data processing system 12 communicates with one or more remote data processing systems (18 or 118) associated with trading partners on technical parameters of software, hardware, or both of each remote data processing system (18 or 118). For example, the management system 14 polls remote data processing systems 18 associated with trading partners on technical parameters (e.g., operational status) of software, hardware or both of each remote data processing system (18 or 118). If the base data processing system 12 handles the polling of different remote data processing systems (18 or 118), the base data processing system 12 may route, direct, or forward any response of the remote data processing systems (18 or 118) to the management system 14.

In an alternate embodiment, one or more remote data processing systems 18 may report technical parameters of software, hardware, or both to the management system 14 on a contention basis, rather than a polling basis.

In step S22, the management system 14 receives a report message or an indication on at least one of the technical parameters via the communications network 16. In one embodiment, the report message may constitute an acknowledgement. The indication may constitute the lack of an acknowledgement that indicates disablement of particular remote data processing system (18 or 118) where the management system 14 expects a certain acknowledgment in response to a polling message transmitted in step S10 to the particular remote data processing system (18 or 118).

The technical parameter or parameters of the remote data processing system (18 or 118) include one or more of the following items: a type of software module installed in a corresponding remote data processing system (18 or 118), a version of a software module or software installed in the corresponding remote data processing system (18 or 118), the active or available software features that have been activated or authorized for use by the corresponding remote data processing system (18 or 118), a hardware configuration of at least one remote data processing system (18 or 118), a software configuration of at least one remote data processing system (18 or 118), application configuration, operating system configuration, and operational status data. The technical parameters may be expressed as technical parameter data.

The operational status includes the status of execution or processing by a particular remote data processing system 18 associated with a corresponding remote identifier. The operational status data may indicate whether the performance of the remote data processing system (18 or 118) complies with a target performance metric (e.g., a target executable time per transaction). For example, the operational status data may indicate whether a particular remote data processing system (18 or 118) is operational or disabled with respect to executing one or more transactions.

In step S24, at the management system 14 or the a data manager 44 retrieves reference technical parameter data on hardware, software or both from a reference parameters storage 46. The reference parameters storage 46 may store reference technical parameter data on a reference technical parameter (e.g., reference operational data or a reference configuration). The reference technical parameter data may define a requisite configuration for one or more remote data processing systems (18 or 118) to foster compatibility with the base data processing system 12.

In one embodiment, the reference technical parameter data include groupings of a reference base software module 22 and one or more reference remote software modules (60 or 160) that are compatible with the reference base software module 22. The grouping may coincide with a trading group. A software module may be defined by type of software module, version of the software module, or a module identifier that indicates type of the software module and the version of the software module.

In another embodiment, the reference technical parameter data may include a latest feature set or desired feature set for conducting business-to-business transactions with the trading partners via a communications network 16. The latest feature set may establish a desired configuration for each remote data processing system (18 or 118) and the base data processing system 12 of a trading group. The trading partners of the trading group may contractually agree to deploy the latest feature set or the desired feature set. Alternatively, the trading partners may reach a consensus for the desired feature set in accordance with other business or technical practices, rather than a contractual agreement.

The reference technical parameter data in the reference parameters storage 46 may be entered via a user interface 34. For example, a service provider or technician may enter desired or aspirational reference technical parameter data into the reference parameters storage 46 for upgrading and maintaining the functionality of the business-to-business environment among the trading partners. The level of performance and the finances required to achieve a desired level of performance may require some degree of balance and judgment by a service provider and/or the trading partners. Accordingly, the reference parameter data in the reference parameters storage 46 may represent the consensus of the trading partners on what target level of performance, which may be less than aspirational technical parameters, is acceptable for conducting business transactions over the communications network 16. The decision on the target level of performance may also be delegated to the service provider who controls the management system 14 and is bound to adhere to a certain budgetary constraint for example. From time to time, a service provider may update the reference database 46 to achieve enhanced functionality or to add new features to the business-to-business environment.

In step S26 following step S24, a data processor 30 of the management system 14 determines if the received technical parameter data in the report message from the remote status reporter 56 of the remote data processing system (18 or 118) complies with or matches the reference technical parameter data retrieved from the reference parameters storage 46. The data in the reference parameters storage 46 may be organized by remote identifiers of different remote data processing system (18 or 118). The remote identifier may indicate the identity of a particular corresponding remote data processing system (18 or 118) or the identity of a business entity affiliated with the remote data processing system (18 or 118).

The comparison in step S26 preferably compares the reference technical parameter data with the received technical parameter data on a remote-identifier basis, where each trading partner has a remote identifier associated with a corresponding remote data processing system (18 or 118). If the data processor 30 determines that the received technical parameter data of the particular data processing system (e.g., next business-to-business server) complies with or matches the reference technical parameter data, then the method continues with step S28. However, if the data processor 30 determines that the received technical parameter data of the particular data processing system does not comply with or match the reference technical parameter data, then the method continues with step S32.

In step S28, the management system 14 determines if all of the remote data processing systems (18 or 118) in a defined group (e.g., trading group) have been checked for compliance with the applicable reference technical parameter data. That is, the management system 14 determines if the remote data processing systems (18 or 118) affiliated with each trading partner have been previously evaluated in accordance with step S26. If all of the remote data processing systems (18 or 118) in the defined group have not been checked for compliance with the reference technical parameter data, then the method continues with step S26, wherein the next remote data processing system is evaluated. A counter may be incremented each time the received parameters of a different remote data processing system (18 or 118) are evaluated until the counter reaches the total number in the defined group. Once the counter reaches the total number of the defined group, all of the remote data processing systems (18 or 118) within the group have been considered. Accordingly, if all of the remote data processing systems (18 or 118) in a defined group have been checked for compliance with the reference technical parameter data, then the method ends in step S30.

In step S32, which may follow step S26, the data processor 30 determines if the same type of software modules are specified in the reference technical parameter data as the received technical parameter data with respect to a particular remote data processing system (18 or 118). If the same type of software modules are specified in both the reference technical parameter data and the received technical parameter data, then the method continues with step S36. If the reference technical parameter data specifies a different type of software module than that of the received technical parameter data, then the method continues with step S34.

In step S34, the management system 14 or a managing communications interface 28 sends or allocates a particular software module of a certain type to the particular remote data processing system (18 or 118) to remedy the detected discrepancy of the software type of step S32. For example, the management system 14 may retrieve a particular software upgrade module from a revision storage 50 and authorize the transmission of the particular retrieved software upgrade module to the remote data processing system (18 or 118) via the communications network 16.

Here, the particular software upgrade module refers to an upgrade candidate that is identified based on the detected deficiency. If the particular remote data processing system (18 or 118) has the requisite hardware to support the particular upgrade software module, a remote status reporter 56 of the data processing system may send a hardware status report to the management system 14 with the remote identifier of the remote data processing system (18 or 118) and technical parameter data to indicate that the hardware is capable of supporting a new upgrade module. However, if the particular remote data processing system 18 lacks the requisite hardware to adequately support the upgrade software module, a remote status reporter 56 may send technical parameter data (e.g., a hardware status report) to the management system 14 so indicating along with the remote identifier.

The management system 14 may handle the transmission of the upgrade to the remote data processing system 18 in accordance with various alternative techniques. Under one technique, the particular upgrade software module is not sent to the remote data processing system (18 or 118) until the remote data processing system (18 or 118) is authorized to install the upgrade software module by a confirmation of readiness or preparedness from the remote status reporter 56 of the remote data processing system (18 or 118) to be upgraded. For example, upon receipt of a confirmation of adequate hardware to support the upgrade software module at the particular remote data processing system (18 or 118), the management system 14 may authorize transmission or transmit the upgrade module to the remote data processing system (18 or 118) via the communications network 16.

In step S36, the data processor 30 or management system 14 determines if the same version of the software module is present in the received parameter data and in the retrieved reference parameter data. The version of the software module may impact the features that are available in the same type of software module or the interoperability of software modules. For example a software module of an earlier version and a later version may or may not be compatible. Similarly, an earlier version of the software module may require less rigorous or less elaborate hardware components than a later version of the same type of software module. In general, each remote software module (60 or 160) may be associated with a version identifier and a general module identifier to facilitate comparison of the different software modules.

If the data processor 30 or management system 14 determines that the same version of the software module is present in the received technical parameter data as that specified in the referenced technical parameter data, then the method continues with step S40. However, if the same version of the software modules is not specified in the referenced technical parameter data and the received technical parameter data, then the method continues with step S38.

In step S38, the managing communications interface 28 or the management system 14 sends or allocates a desired version (e.g., latest version) of the software (e.g., a new remote software module) to the particular remote data processing system (18 or 118) with a particular identifier consistent with the software version deficiency identified in step S36. Here, the particular remote data processing system (18 or 118) refers to the remote data processing system (18 or 118) with the software version deficiency noted in step S36. The desired version may be retrieved from the revision storage 50 or elsewhere.

The management system 14 may handle the transmission of the latest or desired version of the upgrade to the remote data processing system (18 or 118) in accordance with various alternative techniques. Under one technique, the desired version of the upgrade software module is not sent to the remote data processing system 18 until the remote data processing system 18 is authorized to install the upgrade software module by a readiness confirmation from the remote status reporter 56 of the particular remote data processing system 18 to be upgraded. For example, upon receipt of a confirmation of adequate hardware to support the upgrade software module at the particular remote data processing system 18, the management system 14 may authorize transmission or transmit the desired version of the upgrade software module to the remote data processing system 18 via the communications network 16.

Step S40 may follow step S36 or step S38. In step S40, the data processor 30 or management system 14 determines if a hardware upgrade or additional hardware is required to support the planned installation of the particular upgrade software module, a new software module or the desired version of the software module. The planned installation of the particular upgrade software module may include a type upgrade or a version upgrade of an existing software module consistent with step S34 or step S38, respectively. The remote control module 54 confirms whether the remote data processing system (18 or 118) has the requisite hardware to support the desired or latest version of the software module, either prior to sending the desired version of the software module to a remote data processing system (18 or 118) via the communications network 16 or prior to authorizing the remote data processing system (18 or 118) to install the sent upgrade software module into the remote data processing system (18 or 118). At the remote data processing system 18, the remote control module 54 may seek the receipt of an approval from the management system 14 before implementing or installing any received upgrade module from the management system 14.

If the processor determines that additional hardware upgrade or additional hardware is required to support the planned installation, then the method continues with step S42. However, if the processor determines that a hardware upgrade is not required to support the planned installation of the upgrade software module or the particular desired version of the upgrade software module, then the method continues with step S44.

In step S42, the presentation module 42 or the management system 14 generates an alert message for presentation of a user interface 34. The alert message may inform a user that a hardware upgrade may be required for the particular remote data processing system (18 or 118). Accordingly, the management system 14 may wait prior to sending an upgrade software module or an authorization to install the upgrade software module in the remote data processing system (18 or 118) via the communications network 16.

The authorization or validation may occur where the remote data processing system 18 generates a status report from the status reporter 56 that indicates that a hardware revision has taken place. The hardware specifications may be sent to the management system 14 as technical parameter data and the base data processing system 12 or the management system 14 may generate an approval message that authorizes the installation of the remote software module upgrade resident in or transmitted to the remote data processing system (18 or 118).

In step S44, the remote data processing system (18 or 118) revises the software configuration of the remote data processing system (18 or 118) based on the receipt of one or more of the following items: an appropriate version of the software to overcome a software version deficiency noted in step S36, an appropriate upgrade software module to overcome a software type deficiency noted in step S32, a latest version of an upgrade software module, and a new software module. A revision module 59 at the remote data processing system (18 or 118) is responsible for revising or updating the software configuration of the remote data processing system (18 or 118). For example, the revision module 59 may replace an outdated, active remote software module 60 with an upgrade software module received from the management system 14 upon approval of the management system 14 or otherwise.

In step S46 following step S44, the monitor 36 of the management system 14 may confirm replacement or revision by querying or checking the operational status of the revised or upgraded remote data processing system (18 or 118) via a direct request via the communications network 16 or incidental to a polling procedure for monitoring operational status of the remote data processing system (18 or 118). For example, the remote data processing system (18 or 118) may send an acknowledgment that the revision module has successfully revised the software module within the remote data processing system (18 or 118).

If the replacement or revision is monitored pursuant to a polling procedure, the management system 14 may experience a delay of up to one polling cycle before the confirmation is received. In contrast, the direct request via the communications network 16 may produce a more rapid turnaround time than one polling cycle.

Following step S46, the method may return to step S28. The base data processing system 12 may be affiliated with a primary trading partner at a primary site, whereas the remote data processing systems (18 or 118) may be affiliated with secondary trading partners that receive information technology service and upgrades of their remote data processing systems (18 or 118) via the primary trading partner or an affiliated service provider. The return to step S28 ensures that the management system 14 has considered the remote data processing systems (18 or 118) of each of the secondary trading partners. The defined group of trading partners specified in step S28, and generally in FIG. 11 and FIG. 12, may be, but need not be, restricted to less than all of the available trading partners of a trading group to meet the particular needs and circumstances of the primary and secondary trading partners.

Figure 11:
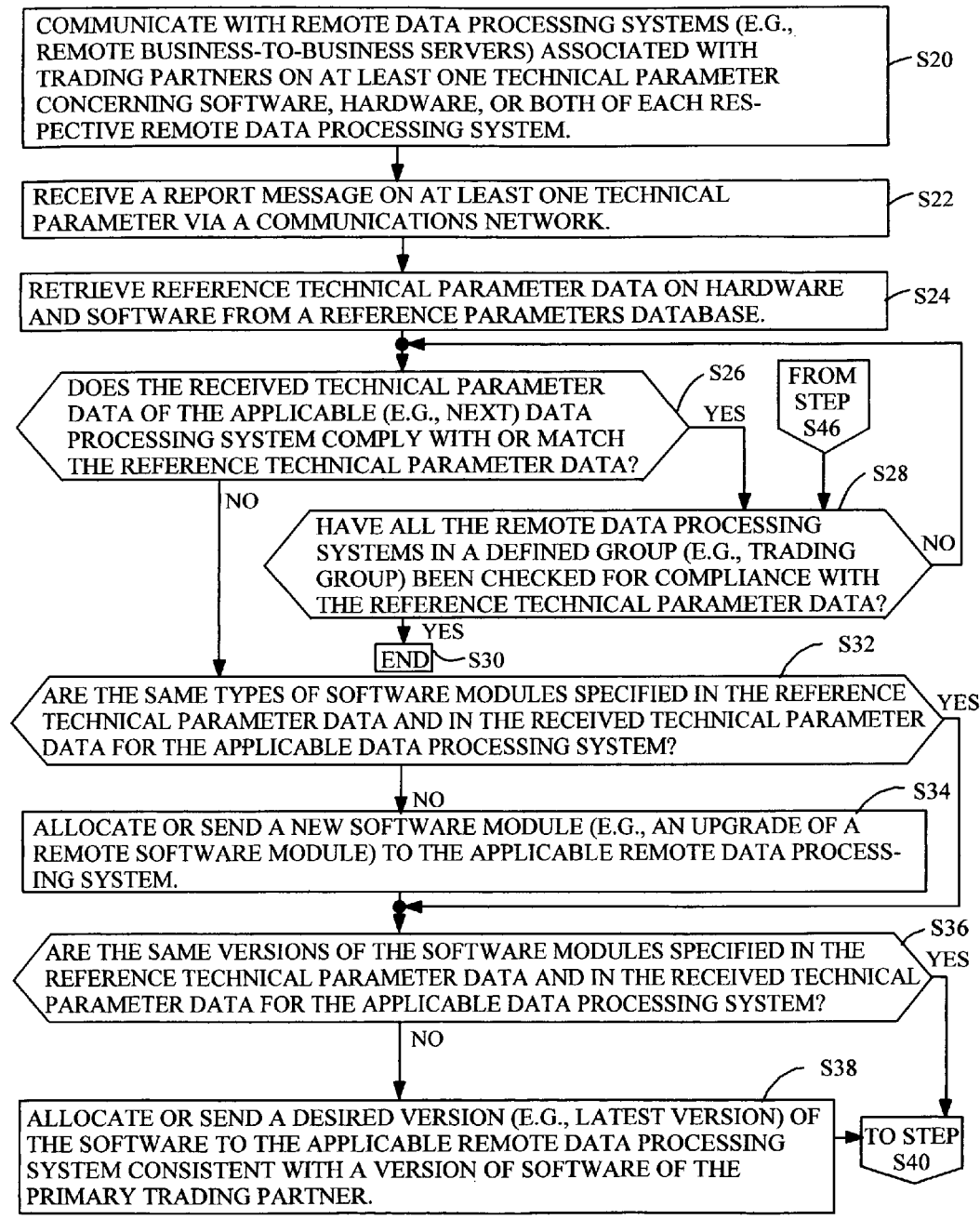
FIG. 11 and FIG. 12 are a flow chart of a method for updating a software module in accordance with the invention.
Figure 12:
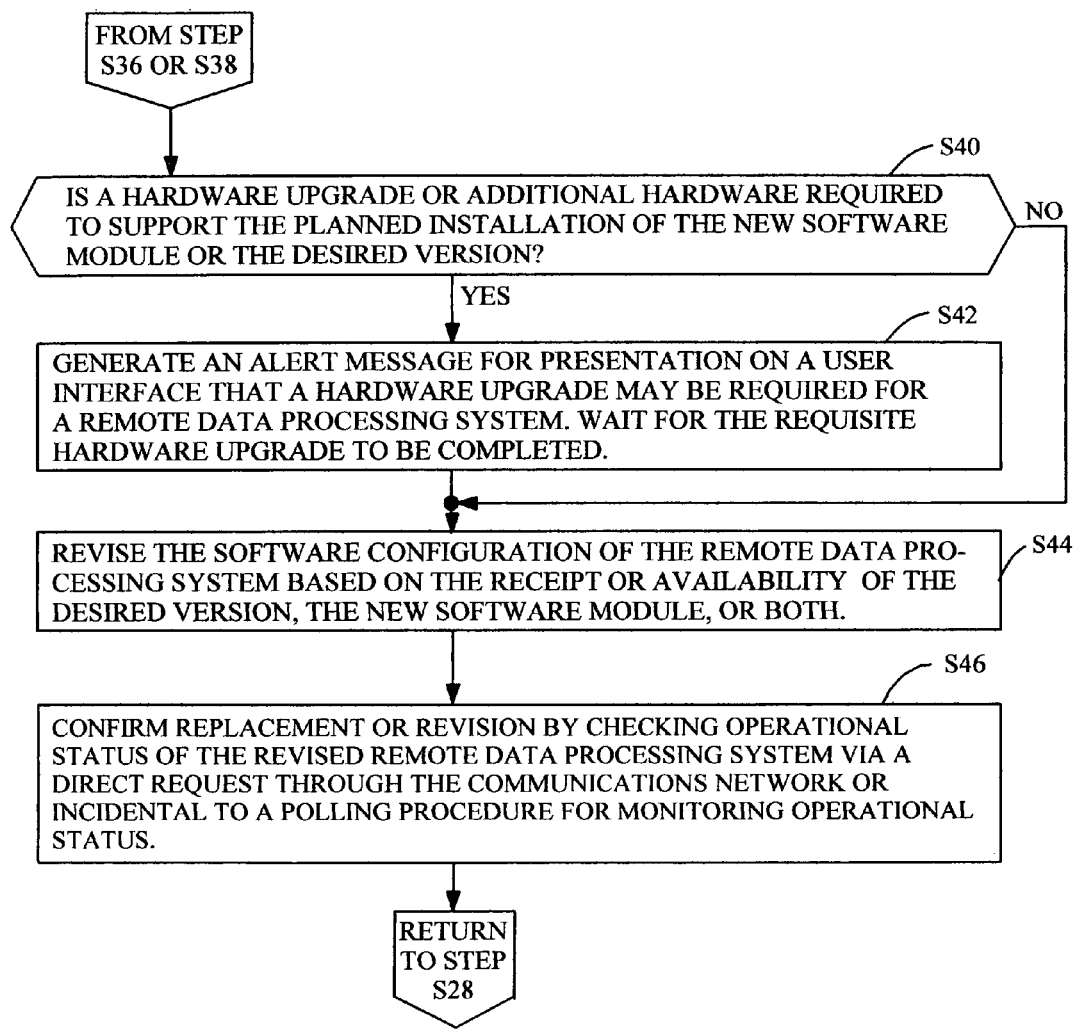
Figure 13:
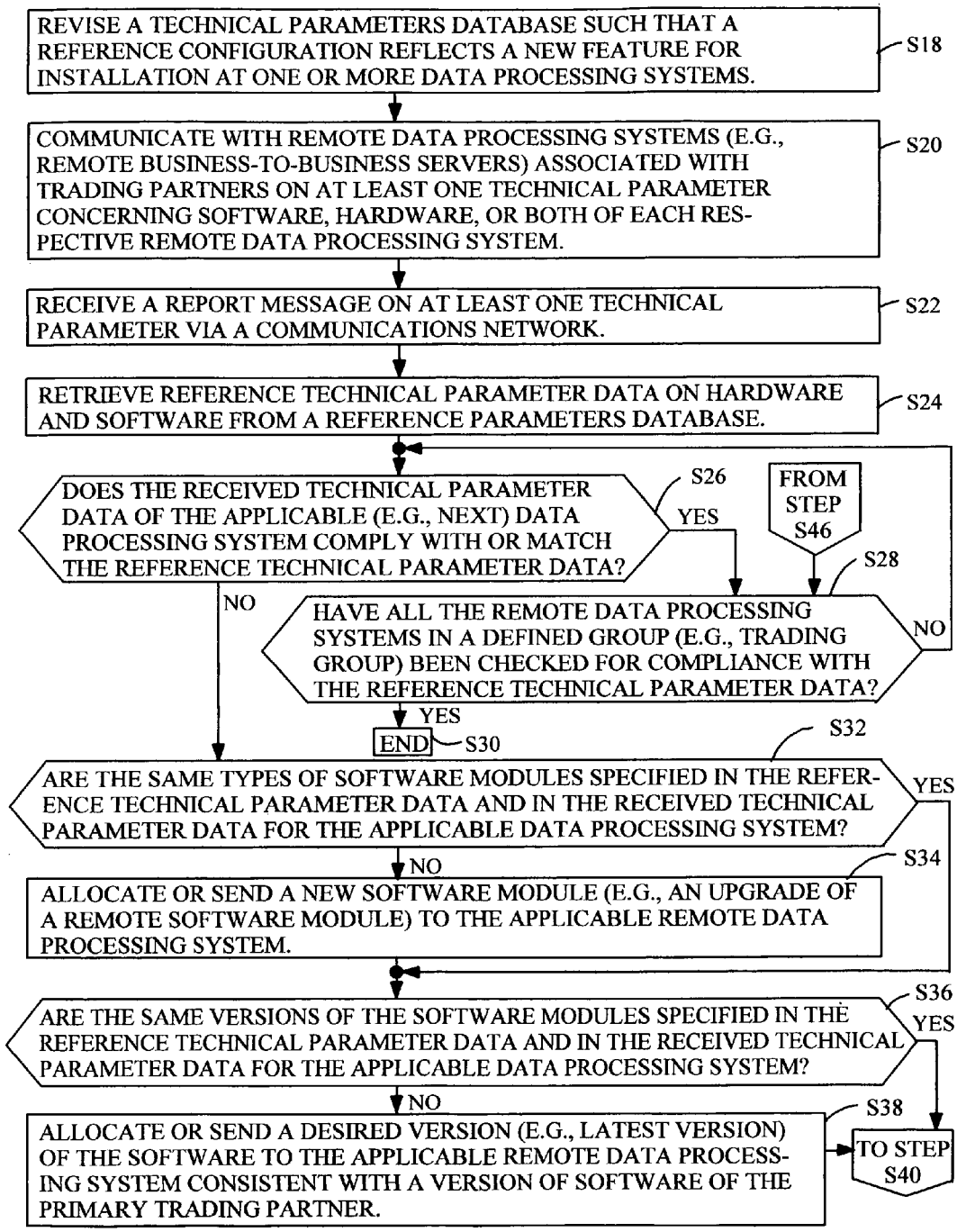
FIG. 13 and FIG. 14 are a flow chart of a method for adding a new feature to a remote data processing system via the management system in accordance with the invention.
Figure 14:
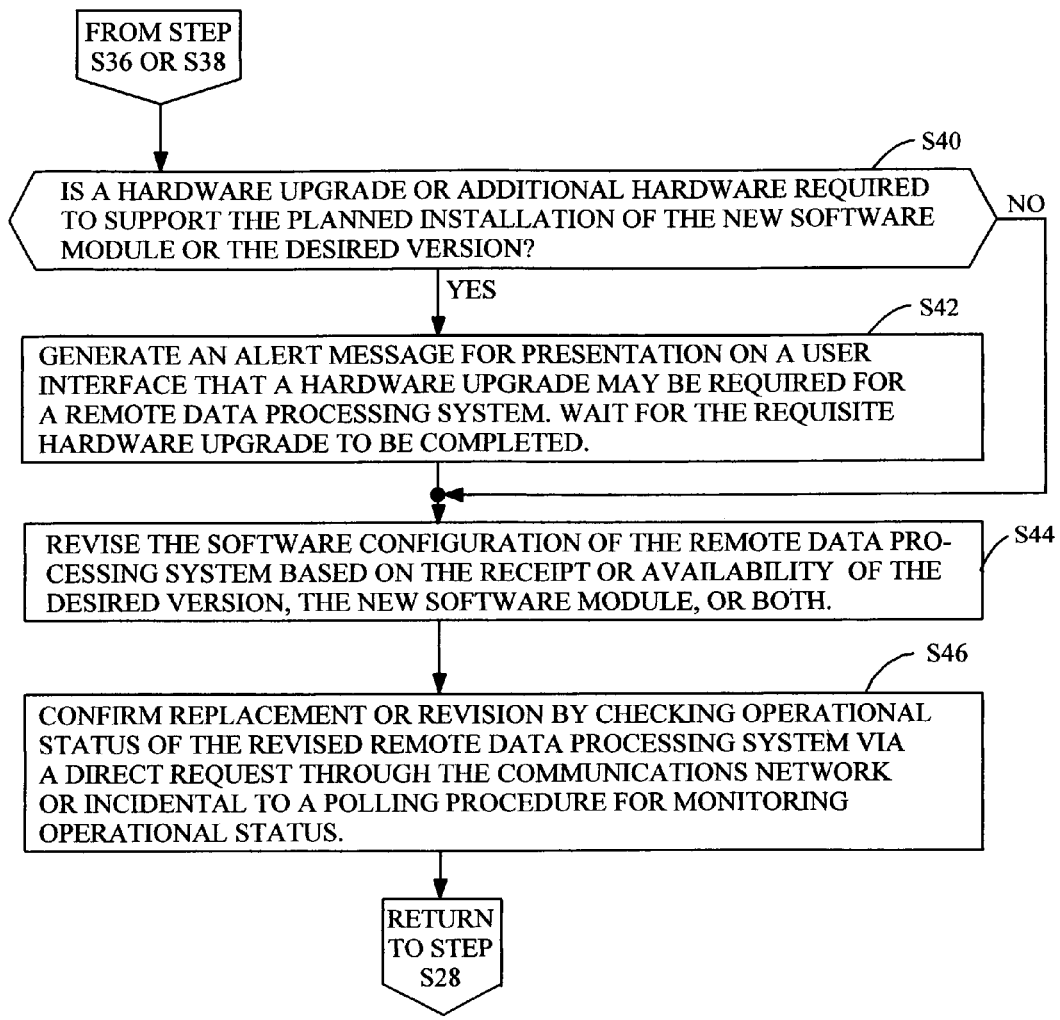

The method of FIG. 13 and FIG. 14 shows a flow chart of managing a remote data processing system that supports adding or removing a feature from one or more remote data processing systems (18 or 118) in accordance with the invention. Like steps in FIG. 11 and FIG. 12 are indicated by like reference numerals in FIG. 13 and FIG. 14. The method of FIG. 13 and FIG. 14 is similar to the method of FIG. 11 and FIG. 12 except the method of FIG. 13 and FIG. 14 includes step S18.

Step S18 precedes step S20. In step S18, a user at the management system 14 may enter data on revising the reference technical parameters and the reference parameters storage 46 such that a reference configuration for a corresponding remote data processing system (18 or 118) reflects a new feature for installation at the remote data processing system (18 or 118). The reference parameter data within the reference parameters storage 46 may be specified on a remote-identifier basis such that each secondary trading partner is compatible with the base data processing system 12 for a trading group. Further, each secondary trading partner within the trading group may be configured identically or differently so long as compatibility with the base data processing system 12 of the trading group is maintained. Accordingly, different remote data processing systems (18 or 118) may support different features depending upon the needs of the trading partners within the trading group.

The reference parameter data may be grouped according to one or more remote identifiers of corresponding remote data processing systems (18 or 118). The reference parameter data may include one or more of the following: a configuration associated with a revision, hardware configuration data, software configuration data, a presence of a particular type of software module, the absence of a particular type of software module, a desired version (e.g., a latest version) of a software module, the desired version of an operating system, the type of an operating system, or other technical parameters that may affect the operation and reliability and interoperability of the remote data processing system (18 or 118) with the base data processing system 12 via the communications network 16.

Figure 15:
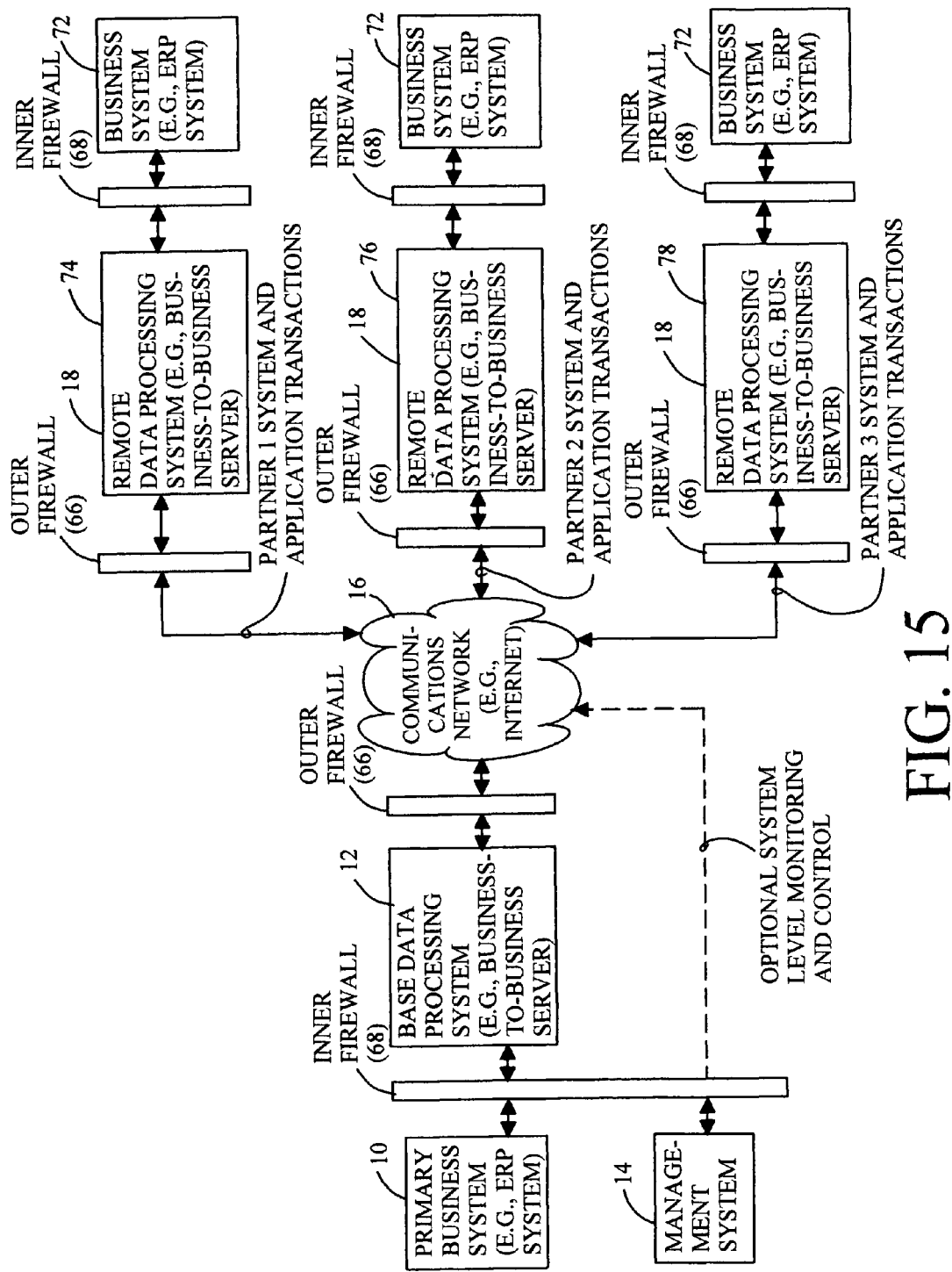
FIG. 15 is a block diagram of an alternate embodiment of a business-to-business system in accordance with the invention.

FIG. 15 shows an alternate embodiment of a business-to-business communications system. Like reference numerals in FIG. 1 and FIG. 15 indicate like elements. The communications system of FIG. 15 is similar to the system of FIG. 1 except the system of FIG. 15 includes firewalls as a security measure to protect the integrity of the data shared by the trading group from tampering by unauthorized users. The unauthorized user may be associated with terminals or clients that are coupled to the communications network (e.g., Internet). The management system 14 can monitor and configure or reconfigure the remote data processing system 18. However, the management system 14 is not necessarily configured to monitor or configure the secondary business system 72 because of security measures (e.g., a firewall) and other technical considerations.

The base data processing system 12 may be associated with one or more firewalls. Similarly, the remote data processing system 18 may be associated with one or more firewalls (66, 68). In one embodiment, an outer firewall 66 is placed in the communication path between the communications network 16 and a data processing system (e.g., base data processing system 12 or a remote data processing system 18), whereas an inner firewall 68 is disposed in a communications path between the remote data processing system 18 and a secondary business system 72. An inner firewall is positioned in a communications path between the primary business system 70 and the base data processing system 12. A firewall, inner firewall 68, or outer firewall 66 refers to software, hardware, or both that filters or blocks the passage of data messages that meet a defined security criteria. The defined security criteria may represent a source identifier, a destination identifier, a content indicator, or some other attribute associated with the data message. The source identifier and destination identifier may be found in a header of a data packet under certain data protocols, for example.

The management system 14 and method of the invention facilitates the primary business entity or an affiliate acting as a service provider for maintaining the remote data processing systems (18 or 118) within a defined trading group. The service provider may maintain control over the remote data processing systems (18 or 118) and their components even though the remote data processing systems (18 or 118) may be widely geographically dispersed across the United States or in foreign countries. The service provider can keep the software of the trading partners or secondary business entities in step with each other and the primary business entity to promote technical interoperability and timely, costeffective upgrades of software features. In an alternative embodiment, the management of the business-to-business system may be distributed among trading partners, where each trading partner has access to a management system 14 and its associated procedures.

Accordingly, the management system is well suited for maintaining reliable communications and facilitating efficient transactions among the trading partners in a business-to-business, electronic commerce environment. Via the management system, a single service provider is able to upgrade the technical parameters of the business-to-business system in a uniform way that keeps the functionality of the remote data processing systems up-to-date without causing disruptions in communications from platform conflicts or other communication problems.

The foregoing description of the system and method describe several illustrative examples of the invention. Modifications, alternative arrangements, and variations of these illustrative examples are possible and may fall within the scope of the invention. Accordingly, the following claims should be accorded the reasonably broadest interpretation, which is consistent with the specification disclosed herein and not unduly limited by aspects of the preferred embodiments disclosed herein.

The following is claimed:

1. A remote data processing system including a hardware component, comprising:
    a data receiver for receiving a data message;
    a remote software module arranged to receive the data message from the data receiver, the remote software module including at least a first stage software component cascaded with a second stage software component; and
    a fault detector coupled to the data receiver and further connected before and after the first software stage component and connected before and after the second software stage component to detect a fault in the remote software module by detecting whether the data message flows from the data receiver to and through the first stage software component, the second stage software component, or both.

2. The system according to claim 1 further comprising a remote status reporter for reporting a status message on at least one of the remote software module and hardware of the remote data processing system.

3. The system according to claim 1 further comprising a database for storing detected faults, stage identifiers, and fault descriptions outputted by the fault detector.

4. The system according to claim 1 further comprising a database for storing status data on corresponding components of a remote data processing system.

5. The system according to claim 1 further comprising a database, the fault detector logging one or more error messages into the database.

6. The system of claim 1 further comprising a feedback generator associated with the remote software module, the feedback generator receiving a status code outputted from the remote software module and forwarding the status code to a transmitter for transmission via a communications network.

7. The system according to claim 1 further comprising a feedback generator associated with the remote software module, the feedback generator generating a status code for a transmitter upon detection of a status code from the remote software module.

8. The system according to claim 1 wherein the fault detector has logical connections including a connection with an input of the first software stage component, an output of the first software stage component, and an output of the second software stage component.

9. The system according to claim 8 wherein the fault detector identifies the first software stage component as a faulty software component if the data message is present at an input of the first software stage component, but not the output of the first software stage component.

10. The system according to claim 8 wherein the fault detector identifies the second software stage component as a faulty software component if the data message is present at an input of the second software stage component, but not the output of the second software stage component.

11. The system according to claim 8 wherein the fault detector identifies the first software stage component as a faulty software component if a derivative of the data message is present at an input of the first software stage component, but not the output of the first software stage component.

12. The system according to claim 8 wherein the fault detector identifies the second software stage component as a faulty software component if a derivative of the data message is present at an input of the second software stage component, but not the output of the second software stage component.

13. A method for monitoring a remote data processing system, the method comprising:
    receiving with a data receiver a data message from a base data processing system via a communications network that is external to the remote data processing system;
    cascading at least a first stage software component and a second stage software component to form an installed remote software module of the remote data processing system for accepting the received data message;
    detecting the data message at a group of logical nodes arranged before and after the first stage software component and before and after the second stage software component without interrupting the flow of the data message through at least a portion of the installed remote software module to determine flow of the data message between the logical nodes and, hence, flow through the first stage software component, the second stage software component, or both;
    connecting a fault detector to the data receiver and to each of the group of logical nodes and detecting with the fault detector whether the data message flows from the data receiver to and through the first stage software component, the second stage software component, or both; and
    identifying a deficient software component of the installed remote software module as any of said software stage components that blocks or disrupts the flow of the data message between two adjacent logical nodes.

14. The method of claim 13 further comprising:
    passing a status code, distinct from the data message, from at least an input of the installed remote software module to an output of the installed remote software module to indicate that the installed remote software module is operational.

15. The method of claim 13 further comprising:
passing a status code from at least an input of the communications network to an output of the communications network to indicate that the communications network is operational.

16. The method of claim 13 further comprising:
routing the status code from the base data processing system via the communications network to the remote data processing system; and
routing the status code from the remote data processing system to the base data processing system via the communications network to indicate the continuity of at least one logic data path traversed by the status code.

17. The method according to claim 13 further comprising:
tapping into a logical data path between the first stage software component and the second stage software component to detect whether each of the first and second stage software components are functioning.

18. The method according to claim 13 further comprising:
determining that one of the at least a first stage software component and a second stage software component immediately following the last detected data message is at fault.

19. The method according to claim 13 further comprising:
assigning stage identifiers to distinguish the at least a first stage software component and a second stage software component from one another and to identify a faulty stage.

20. The method according to claim 19 further comprising:
associating a fault description with each of the stage identifiers for transmission to a management system via a communications network.

21. The method according to claim 13 further comprising:
archiving a fault analysis report in a database associated with the remote processing system.

22. A remote data processing system including a hardware component, comprising:
a data receiver for receiving a data message;
a remote software module in communication with the data receiver via a first pathway so as to receive the data message from the data receiver, the remote software module including at least a first stage software component cascaded with a second stage software component, wherein the first stage software component is in communication with the second stage software component via a second pathway; and
a fault detector in communication with the first pathway via a third pathway that does not extend coincidentally with and along a length of the first pathway and in communication with the second pathway via a fourth pathway that does not extend coincidentally with and along a length of the second pathway, wherein the fault detector detects a fault in the remote software module by detecting whether the data message flows from the data receiver to and through at least one of the first stage software component and the second stage software component by detecting whether the data message is present in the third pathway and the fourth pathway.

23. The system according to claim 22 further comprising a fifth pathway in communication with an output of the second stage software component and the fault detector, wherein the fifth pathway does not overlap the output and the fault detector detects a fault in the remote software module by detecting whether the data message flows entirely through at least one of the first stage software component and the second stage software component by detecting whether the data message is present in the fifth pathway.

24. The system according to claim 22 further comprising a remote status reporter for reporting a status message on at least one of the remote software module and hardware of the remote data processing system.

25. The system according to claim 22 further comprising a database for storing detected faults, stage identifiers, and fault descriptions outputted by the fault detector.

26. The system according to claim 22 further comprising a database for storing status data on corresponding components of a remote data processing system.

27. The system according to claim 22 further comprising a database, the fault detector logging one or more error messages into the database.

28. The system of claim 22 further comprising a feedback generator associated with the remote software module, the feedback generator receiving a status code outputted from the remote software module and forwarding the status code to a transmitter for transmission via a communications network.

29. The system according to claim 22 further comprising a feedback generator associated with the remote software module, the feedback generator generating a status code for a transmitter upon detection of a status code from the remote software module.

30. The system according to claim 22 wherein the fault detector has logical connections including a connection with an input of the first software stage component, an output of the first software stage component, and an output of the second software stage component.

31. The system according to claim 30 wherein the fault detector identifies the first software stage component as a faulty software component if the data message is present at an input of the first software stage component, but not the output of the first software stage component.

32. The system according to claim 30 wherein the fault detector identifies the second software stage component as a faulty software component if the data message is present at an input of the second software stage component, but not the output of the second software stage component.

33. The system according to claim 30 wherein the fault detector identifies the first software stage component as a faulty software component if a derivative of the data message is present at an input of the first software stage component, but not the output of the first software stage component.

34. The system according to claim 30 wherein the fault detector identifies the second software stage component as a faulty software component if a derivative of the data message is present at an input of the second software stage component, but not the output of the second software stage component.

35. A method for monitoring a remote data processing system, the method comprising:
receiving a data message with a data receiver from a base data processing system via a communications network that is external to the remote data processing system;
cascading at least a first stage software component and a second stage software component to form an installed remote software module of the remote data processing system for accepting the received data message and having the data message flow along a pathway from an input of the first stage software component to an output of the second stage software component;
detecting the data message at a first node before the first stage software component and at a second node after the first stage software component to determine flow of the data message between the first and the second nodes and, hence, flow through the first stage software component;
detecting the data message at a third node before the second stage software component and at a fourth node after the second stage software component to determine the flow of the data message between the third and the fourth nodes and, hence, flow through the second stage software component;

connecting a fault detector to the data receiver and to first node, the second node, the third node and the fourth node and detecting with the fault detector whether the data message flows from the data receiver to the first node, the second node, the third node, the fourth node, or a combination thereof and through the first stage software component, the second stage software component, or both; and identifying a deficient software component of the installed remote software module as any of said software stage components that blocks or disrupts the flow of the data message between the first and the second nodes and between the third and the fourth nodes.

36. The method of claim 35 further comprising:

passing a status code, distinct from the data message, from at least an input of the installed remote software module to an output of the installed remote software module to indicate that the installed remote software module is operational.

37. The method of claim 35 further comprising:

passing a status code from at least an input of the communications network to an output of the communications network to indicate that the communications network is operational.

38. The method of claim 35 further comprising:

routing the status code from the base data processing system via the communications network to the remote data processing system; and routing the status code from the remote data processing system to the base data processing system via the communications network to indicate the continuity of at least one logic data path traversed by the status code.

39. The method according to claim 35 further comprising:

tapping into a logical data path between the first stage software component and the second stage software component to detect whether each of the first and second stage software components are functioning.

40. The method according to claim 35 further comprising:

determining that one of the at least a first stage software component and a second stage software component immediately following the last detected data message is at fault.

41. The method according to claim 35 further comprising:

assigning stage identifiers to distinguish the at least a first stage software component and a second stage software component from one another and to identify a faulty stage.

42. The method according to claim 41 further comprising:

associating a fault description with each of the stage identifiers for transmission to a management system via a communications network.

43. The method according to claim 35 further comprising:

archiving a fault analysis report in a database associated with the remote processing system.

* * * * *